US009267042B2

(12) United States Patent
Käser et al.

(10) Patent No.: US 9,267,042 B2
(45) Date of Patent: Feb. 23, 2016

(54) COATING COMPOSITION FOR MARKING SUBSTRATES

(75) Inventors: Adolf Käser, Bottmingen (CH); Jonathan Campbell, Riehen (CH)

(73) Assignee: DATALASE LTD., Cheshire (GB)

( * ) Notice: Subject to any disclaimer, the term of this patent is extended or adjusted under 35 U.S.C. 154(b) by 1025 days.

(21) Appl. No.: 13/123,603

(22) PCT Filed: Oct. 16, 2009

(86) PCT No.: PCT/EP2009/063521
§ 371 (c)(1),
(2), (4) Date: Jul. 21, 2011

(87) PCT Pub. No.: WO2010/049282
PCT Pub. Date: May 6, 2010

(65) Prior Publication Data
US 2011/0274893 A1    Nov. 10, 2011

(30) Foreign Application Priority Data

Oct. 27, 2008   (EP) ..................................... 08167675

(51) Int. Cl.
| B41M 5/323 | (2006.01) |
| C09D 11/02 | (2014.01) |
| B41M 5/333 | (2006.01) |
| C09D 11/14 | (2006.01) |

(52) U.S. Cl.
CPC .............. *C09D 11/02* (2013.01); *B41M 5/323* (2013.01); *B41M 5/3333* (2013.01); *C09D 11/14* (2013.01); *Y10T 428/24802* (2015.01)

(58) Field of Classification Search
CPC .... B41M 5/323; B41M 5/3333; B41M 5/267; B41M 2005/365; C09D 5/26; C09D 11/14; Y10T 428/24802
USPC .................. 503/201, 202, 204, 221
See application file for complete search history.

(56) References Cited

U.S. PATENT DOCUMENTS

| 2,357,725 | A | 9/1944 | Bennett |
| 2,427,443 | A | 9/1947 | Cochran |
| 2,800,457 | A | 7/1957 | Green et al. |
| 3,373,170 | A | 3/1968 | Jones |
| 3,513,114 | A | 5/1970 | Hahn et al. |
| 3,778,383 | A | 12/1973 | Schibler et al. |
| 3,853,791 | A | 12/1974 | Feins |
| 3,955,987 | A | 5/1976 | Schaar et al. |
| 3,959,571 | A | 5/1976 | Yahagi et al. |
| 4,035,559 | A | 7/1977 | Fujii et al. |
| 4,166,811 | A | 9/1979 | Marr et al. |
| 4,237,212 | A | 12/1980 | Inoue et al. |
| 4,241,144 | A | 12/1980 | Hendy |
| 4,325,863 | A | 4/1982 | Hinsken et al. |
| 4,338,244 | A | 7/1982 | Hinsken et al. |
| 4,619,956 | A | 10/1986 | Susi |
| 4,916,247 | A | 4/1990 | Steinnmann et al. |
| 5,035,983 | A | 7/1991 | Kiyonari et al. |
| 5,063,137 | A | 11/1991 | Kiyonari et al. |
| 5,166,350 | A | 11/1992 | Bedekovic et al. |
| 5,175,312 | A | 12/1992 | Dubs et al. |
| 5,198,498 | A | 3/1993 | Valet et al. |
| 5,216,052 | A | 6/1993 | Nesvadba et al. |
| 5,252,643 | A | 10/1993 | Nesvadba |
| 5,256,805 | A | 10/1993 | O'Lenick et al. |
| 5,298,067 | A | 3/1994 | Valet et al. |
| 5,322,868 | A | 6/1994 | Valet et al. |
| 5,358,821 | A | 10/1994 | Bertrand et al. |
| 5,369,140 | A | 11/1994 | Valet et al. |

(Continued)

FOREIGN PATENT DOCUMENTS

| CA | 2042858 | 11/1991 |
| DE | 2130845 | 1/1972 |

(Continued)

OTHER PUBLICATIONS

Notification of Transmittal of the International Search Report of the International Searching Authority mailed Jan. 25, 2010 in International Application No. PCT/EP2000/063521.
Specification sheet for Texicryl S-02 acquired from http://www.scottbader.com/downloads/UK_PDF_Datasheet_Files/Graphic_Arts/Texicryl%20S-02.pdf on Nov. 2, 2012.
Dilute Ammonium Hydroxide acquired from http://www51.honeywell.com/sm/em/common/documents/2.6_usa_msds_81.pdf on Nov. 28, 2011.
"Texicryl 13-567" acquired from http://www.scottbader.com/downloads/UK_PDF_Datasheet_13-567.pdf on Nov. 28, 2011.
Derwent AN 1999-238901[20] of JP 11-67604.
Derwent AN 1990-241627[32] of JP 03-76873.
Preliminary Amendment filed Sep. 11, 2007 in related U.S. Appl. No. 11/886,137.
First Office Action issued May 9, 2011 in related U.S. Appl. No. 11/886,137.

(Continued)

*Primary Examiner* — Gerard Higgins
(74) *Attorney, Agent, or Firm* — Stoel Rives LLP; Zhi-Xiang (Alex) Oh

(57) ABSTRACT

Coating composition comprising a char forming compound as a first compound capable of forming a colored substance upon exposition to energy; at least one latent activator selected from the group consisting of ammonium phosphate, ammonium polyphosphate, ammonium sulfite, ammonium thiosulfate, ammonium sulfamate and ammonium sulfate; and a second compound capable of forming a colored substance upon exposition to energy selected from the group consisting of color formers, oxygen containing transition metal compounds, and metal-chelate-type color forming systems; a coating composition comprising a char forming compound as a first compound capable of forming a colored substance upon exposition to energy, and a second compound capable of forming a colored substance upon exposition to energy selected from the group consisting of color formers and metal-chelate-type color forming systems; a process for the preparation of these compositions, substrates coated with these compositions and a process for their preparation, a process for preparing marked substrates using these compositions and marked substrates obtainable by the latter process.

23 Claims, No Drawings

(56) References Cited

U.S. PATENT DOCUMENTS

| | | |
|---|---|---|
| 5,413,629 A | 5/1995 | Yasui et al. |
| 5,560,769 A | 10/1996 | Conner et al. |
| 5,810,915 A | 9/1998 | Nagai et al. |
| 5,897,938 A | 4/1999 | Shinmoto et al. |
| 5,948,836 A | 9/1999 | Bonora |
| 6,057,380 A | 5/2000 | Birbaum et al. |
| 6,143,904 A | 11/2000 | Zink et al. |
| 6,210,472 B1 | 4/2001 | Kwan et al. |
| 6,261,348 B1 | 7/2001 | Kwan et al. |
| 6,394,594 B1 | 5/2002 | Katsuragi et al. |
| 6,425,947 B1 | 7/2002 | Berlin et al. |
| 6,478,861 B1 | 11/2002 | Kwan et al. |
| 6,888,095 B2 | 5/2005 | Khan |
| 7,144,676 B2 | 12/2006 | Barr et al. |
| 7,202,288 B2 | 4/2007 | Kniess et al. |
| 7,270,919 B2 | 9/2007 | Stubbs |
| 7,410,744 B2 | 8/2008 | Watanabe et al. |
| 7,485,403 B2 | 2/2009 | Khan |
| 7,635,662 B2 | 12/2009 | Kabashima et al. |
| 7,708,974 B2 | 5/2010 | Yadav |
| 7,998,653 B2 | 8/2011 | O'Donoghue et al. |
| 8,083,847 B2 | 12/2011 | Takeda et al. |
| 8,101,545 B2 | 1/2012 | Campbell et al. |
| 8,461,075 B2 | 6/2013 | Watanabe et al. |
| 8,642,504 B2 | 2/2014 | Campbell et al. |
| 8,853,314 B2 | 10/2014 | Mamak |
| 2001/0044553 A1 | 11/2001 | Kabashima et al. |
| 2003/0180660 A1 | 9/2003 | Khan |
| 2003/0186001 A1 | 10/2003 | Khan |
| 2003/0191223 A1 | 10/2003 | Waterkamp et al. |
| 2004/0063817 A1 | 4/2004 | Ilenda et al. |
| 2004/0110870 A1 | 6/2004 | Liu |
| 2004/0157975 A1 | 8/2004 | Kniess et al. |
| 2005/0148467 A1 | 7/2005 | Makitalo et al. |
| 2005/0158548 A1 | 7/2005 | Senga |
| 2006/0040217 A1 | 2/2006 | Stubbs |
| 2006/0155007 A1 | 7/2006 | Huber |
| 2006/0178254 A1 | 8/2006 | Takeda et al. |
| 2006/0223974 A1 | 10/2006 | Winterling et al. |
| 2007/0054220 A1 | 3/2007 | Heneghan |
| 2007/0128542 A1 | 6/2007 | Watanabe et al. |
| 2007/0187653 A1 | 8/2007 | Takeda et al. |
| 2008/0113861 A1 | 5/2008 | Watanabe et al. |
| 2008/0308775 A1 | 12/2008 | Yabuki |
| 2009/0071367 A1 | 3/2009 | Campbell et al. |
| 2009/0214835 A1 | 8/2009 | Campbell et al. |
| 2009/0220749 A1 | 9/2009 | O'Donoghue et al. |
| 2010/0021833 A1 | 1/2010 | Lehmann et al. |
| 2010/0233447 A1 | 9/2010 | Campbell et al. |
| 2010/0239642 A1 | 9/2010 | Campbell et al. |
| 2011/0148092 A1 | 6/2011 | Jarvis et al. |
| 2012/0129090 A1 | 5/2012 | Mamak |

FOREIGN PATENT DOCUMENTS

| | | |
|---|---|---|
| DE | 2914427 | 10/1980 |
| DE | 4316611 | 11/1993 |
| DE | 4316622 | 11/1993 |
| DE | 4316876 | 11/1993 |
| DE | 4338361 | 5/1995 |
| EP | 0187329 | 7/1986 |
| EP | 0434608 | 6/1991 |
| EP | 0458502 | 11/1991 |
| EP | 0546577 | 6/1993 |
| EP | 0589839 | 3/1994 |
| EP | 0591102 | 4/1994 |
| EP | 0600441 | 6/1994 |
| EP | 0690094 | 1/1996 |
| EP | 0704437 | 4/1996 |
| EP | 0796742 | 9/1997 |
| EP | 0812888 | 12/1997 |
| EP | 0980028 | 2/2000 |
| EP | 1291384 | 3/2003 |
| EP | 1676890 | 7/2006 |
| EP | 1847635 | 10/2007 |
| EP | 1859674 | 11/2007 |
| GB | 989264 | 4/1965 |
| GB | 1347467 | 2/1974 |
| GB | 1355124 | 5/1974 |
| GB | 1389716 | 4/1975 |
| GB | 2002801 | 2/1979 |
| GB | 1548059 | 7/1979 |
| GB | 2154597 | 9/1985 |
| GB | 2206419 | 1/1989 |
| GB | 2297091 | 7/1996 |
| JP | 03-76873 | 4/1991 |
| JP | 08-073223 | 3/1996 |
| JP | 11-67604 | 3/1999 |
| JP | 2006-111675 | 4/2006 |
| JP | 2006-132042 | 5/2006 |
| JP | 2006-154516 | 6/2006 |
| WO | WO-94/18278 | 8/1994 |
| WO | WO-96/23659 | 8/1996 |
| WO | WO-96/28431 | 9/1996 |
| WO | WO-98/56852 | 12/1998 |
| WO | WO-98/56853 | 12/1998 |
| WO | WO-00/61377 | 10/2000 |
| WO | WO-02/068205 | 9/2002 |
| WO | WO-02/068207 | 9/2002 |
| WO | WO-02/074548 | 9/2002 |
| WO | WO-02/100914 | 12/2002 |
| WO | WO-2004/043704 | 5/2004 |
| WO | WO-2005/012442 | 2/2005 |
| WO | WO-2005/037932 | 4/2005 |
| WO | WO-2005/068207 | 7/2005 |
| WO | WO-2006/051309 | 5/2006 |
| WO | WO-2006/063165 | 6/2006 |
| WO | WO-2006/064193 | 6/2006 |
| WO | WO-2006/067073 | 6/2006 |
| WO | WO-2006/068205 | 6/2006 |
| WO | WO-2006/108745 | 10/2006 |
| WO | WO-2006/129078 | 12/2006 |
| WO | WO-2007/012578 | 2/2007 |
| WO | WO 2007/031454 | 3/2007 |
| WO | WO-2007/088104 | 8/2007 |
| WO | WO-2007/092030 | 8/2007 |
| WO | WO-2007/141522 | 12/2007 |
| WO | WO 2007141522 A1 * | 12/2007 |
| WO | WO-2008/083912 | 7/2008 |
| WO | WO-2009/010393 | 1/2009 |
| WO | WO-2009/010405 | 1/2009 |
| WO | WO-2009-059901 | 5/2009 |
| WO | WO-2010/046285 | 4/2010 |
| WO | WO-2010/049282 | 5/2010 |

OTHER PUBLICATIONS

Response to the May 9, 2011 Office Action issued Aug. 3, 2011 in related U.S. Appl. No. 11/886,137.

Notice of Allowance issued Sep. 30, 2011 in related U.S. Appl. No. 11/886,137.

International Search Report and Written Opinion issued May 29, 2006 in International Application No. PCT/EP2006/060658.

International Preliminary Report on Patentability issued Sep. 25, 2007 in International Application No. PCT/EP2006/060658.

International Search Report and Written Opinion issued Oct. 30, 2006 in International Application No. PCT/EP2006/064299.

International Preliminary Report on Patentability issued Nov. 27, 2008 in International Application No. PCT/EP2006/064299.

Preliminary Amendment filed Jan. 12, 201 in related U.S. Appl. No. 12/668,666.

First Office Action issued Dec. 11, 2012 in related U.S. Appl. No. 12/668,666.

Response to the Dec. 11, 2012 Office Action filed Jun. 11, 2013 in related U.S. Appl. No. 12/668,666.

Final Office Action issued Aug. 22, 2013 in related U.S. Appl. No. 12/668,666.

International Search Report and Written Opinion issued Sep. 11, 2008 in International Application No. PCT/EP2008/058547.

International Preliminary Report on Patentability issued Jan. 19, 2010 in International Application No. PCT/EP2008/058547.

Preliminary Amendment filed Jan. 12, 2010 in related U.S. Appl. No. 12/668,669.

(56) References Cited

OTHER PUBLICATIONS

First Office Action issued Jul. 11, 2012 in related U.S. Appl. No. 12/668,669.
Response to the Jul. 11, 2012 Office Action filed Oct. 16, 2012 in related U.S. Appl. No. 12/668,669.
Second Office Action issued Jan. 18, 2013 in related U.S. Appl. No. 12/668,669.
Response to the Jan. 18, 2013 Office Action filed Jul. 9, 2013 in related U.S. Appl. No. 12/668,669.
International Search Report and Written Opinion issued Oct. 28, 2008 in International Application No. PCT/EP2008/058637.
International Preliminary Report on Patentability issued Jan. 19, 2010 in International Application No. PCT/EP2008/058637.
International Preliminary Report on Patentability issued May 3, 2011 in International Application No. PCT/EP2009/063521.
Preliminary Amendment filed Apr. 5, 2011 in related U.S. Appl. No. 13/122,563.
International Search Report and Written Opinion issued May 11, 2010 in International Application No. PCT/EP2009/063377.
International Preliminary Report on Patentability issued Apr. 26, 2011 in International Application No. PCT/EP2009/063377.
Preliminary Amendment filed Mar. 10, 2008 in related U.S. Appl. No. 11/991,762.
First Office Action issued Sep. 30, 2010 in related U.S. Appl. No. 11/991,762.
Response to the Sep. 30, 2010 Office Action filed Jan. 26, 2011 in related U.S. Appl. No. 11/991,762.
Notice of Allowance issued Apr. 5, 2011 in related U.S. Appl. No. 11/991,762.
Preliminary Amendment filed Jan. 22, 2008 in related U.S. Appl. No. 11/989,167.
First Office Action issued Dec. 1, 2011 in related U.S. Appl. No. 11/989,167.
Response to the Dec. 1, 2011 Office Action filed Mar. 16, 2012 in related U.S. Appl. No. 11/989,167.
Second Office Action issued Apr. 30, 2012 in related U.S. Appl. No. 11/989,167.
Response to the Apr. 30, 2012 Office Action filed Sep. 27, 2012 in related U.S. Appl. No. 11/989,167.
Final Office Action issued Nov. 8, 2012 in related U.S. Appl. No. 11/989,167.
Response to the Nov. 8, 2012 Office Action filed Apr. 8, 2013 in related U.S. Appl. No. 11/989,167.
Notice of Allowance issued Apr. 19, 2013 related U.S. Appl. No. 11/989,167.
Notice of Allowance issued Aug. 2, 2013 in U.S. Appl. No. 11/989,167.
Notice to File Corrected Application Papers issued Nov. 7, 2013 in U.S. Appl. No. 11/989,167.
Amendment and Response to Notice to File Corrected Application Papers filed Dec. 6, 2013 in U.S. Appl. No. 11/989,167.
Office Action issued Jan. 9, 2014 in U.S. Appl. No. 11/989,167.
Petition to Correct Assignee Information and for Corrected Patent filed Mar. 25, 2014 in U.S. Appl. No. 11/989,167.
Decision on the Petition issued Apr. 1, 2014 in U.S. Appl. No. 11/989,167.
Renewed Petition filed Apr. 17, 2014 in U.S. Appl. No. 11/989,167.
Decision on the Petition issued Jun. 6, 2014 in U.S. Appl. No. 11/989,167.
Response to the Aug. 22, 2013 Office Action filed Nov. 22, 2013 in U.S. Appl. No. 12/668,666.
Office Action issued Dec. 16, 2013 in U.S. Appl. No. 12/668,666.
Office Action issued Dec. 9, 2013 in U.S. Appl. No. 13/122,563.
Response to Dec. 9, 2013 Office Action filed May 8, 2014 in U.S. Appl. No. 13/122,563.
Notice of Allowance issued Jun. 2, 2014 in U.S. Appl. No. 13/122,563.
Office Action issued May 7, 2014 in U.S. Appl. No. 12/668,669.
Response to May 7, 2014 Office Action filed Aug. 19, 2014 in U.S. Appl. No. 12/668,669.
Office Action issued Nov. 25, 2014 in U.S. Appl. No. 12/668,669.
Response to Nov. 25, 2014 Office Action filed Mar. 24, 2015 in U.S. Appl. No. 12/668,669.
Office Action issued Jul. 2, 2015 in U.S. Appl. No. 12/668,669.
Response to Jul. 2, 2015 Office Action Filed Nov. 2, 2015 in U.S. Appl. No. 12/668,669.

* cited by examiner

COATING COMPOSITION FOR MARKING SUBSTRATES

The present invention relates to a coating composition for marking substrates, to a process for the preparation of this composition, to a substrate coated with this composition and to a process for its preparation, to a process for preparing marked substrates using this composition, and to a marked substrate obtainable by the latter process.

Packaging usually needs to be marked with information such as logos, bar codes, expiry dates or batch numbers. One way to achieve this is by coating the packaging with a composition, which upon treatment with energy such as heat forms a visible marking. When using laser irradiation as energy, the marking can be even so small that it is invisible or nearly invisible to the human eye.

US 2005-0148467 A1 discloses a heat-sensitive recording material containing a base material, at least one coating layer, in which layer the chemicals of at least two color forming systems are located. At least one of the color forming systems used is a chelate-type color forming system and the other one at least one leuco dye with at least one urea-based developer.

WO 02/074548 describes coating compositions comprising an oxyanion of a multivalent metal, for example ammonium octamolybdate (AOM), a binder and a solvent. These compositions were coated on a substrate, for example cartonboard, dried and exposed to an IR laser to produce a black marking.

WO 2004/043704 describes coating compositions comprising an amine compound of molybdenum, tungsten or vanadium, an organic solvent and optionally a polymeric binder and/or a colour former. An example of an "amine molybdate" is bis(2-ethylhexyl)amine octamolybdate. The compositions were coated on substrates such as polyethylene terephthalate film, aluminium foil or polypropylene packaging film, dried and exposed to an IR laser or thermal printer to produce grey/black or coloured markings.

WO 2005/012442 describes coating compositions comprising a pigment, water or an organic solvent, a conductive polymer and optionally a binder. The pigment can be an oxyanion of molybdate or tungstate.

WO 02/068207 describes a method for marking an object, wherein the object comprises or is coated with a formulation comprising a material having functional groups such as polyhydroxy compounds, and a metal compound such as alkali metal, alkaline earth metal, iron oxides or salts and organometallics. The two components react on irradiation with a laser to form a yellow or grey/green marking.

The compositions of WO 02/068207 have the disadvantage that they only provide yellow or grey/green markings, but no high contrast coloured markings of any desired colour. In addition, the described compositions are not suitable for coating paper or plastics.

WO 07/088104 discloses a composition comprising a latent activator and a colour former. The composition may contain a sugar alcohol as char forming compound. The most preferred char forming compound is saccharose (sucrose).

WO 07/031454 discloses a coating composition for marking substrates comprising a latent activator and a char forming compound. The char forming compound may be selected from the group consisting of carbohydrates and derivatives thereof wherein the carbonyl group has been reduced to a hydroxyl group. Preferably, the coating composition does not contain a dye or colour former. The composition might contain a smoke suppressant. As an example of a smoke suppressant ammonium octamolybdate is mentioned. The coating composition may contain an inorganic IR absorber, for example an oxide of a metal such as copper, bismuth, or a pigment, for example titan dioxide. These are not compounds which are capable of forming a coloured substance upon exposition to energy.

WO 07/012578 discloses a composition forming a colourless coating, comprising an oxygen containing transition metal compound and an aqueous-based solvent which yields markings of high contrast on exposure to energy. As an additive, the composition may comprise a polyhydroxycompound, in particular sucrose.

U.S. Pat. No. 3,955,987 relates to intumescent compositions and substrates coated with such a heat- or fireproofing coating. In particular, a substrate coated with a water-removable intumescent heat- and fire-proofing composition comprising monoammonium phosphate, diammonium phosphate or mixtures thereof; cyanoguanidine, urea or a mixture thereof; sucrose or sucrose and a hexanehexol; and titanium dioxide as a heat reflecting substance is disclosed.

US 2004/0110870 A1 discloses fire protection coating compositions including a char forming material such as a starch or a sugar and a catalyst or accelerator material such as for example a mono basic ammonium polyphosphate. In addition, the fire protection coating composition includes a pigment that will make the fire protection coating compositions more pleasing to the eye as well as support the composition such a titanium dioxide or iron oxide.

U.S. Pat. No. 3,513,114 discloses according to its abstract an intumescent coating composition which comprises an aqueous dispersion of a polyvinyl acetate-containing emulsion, a solvent plasticizer, a carbonific and substantially water-insoluble ammonium polyphosphate. The intumescent coating composition which is said to exhibit improved wet abrasion resistant properties can contain as a non-resinous carbonific for example a carbohydrated, modified starch, or a polyhydric compound such as hexitols. The composition of Example 1 contains also titanium dioxide.

EP 0 812 888 discloses an ink composition for inkjet recording on a recording medium, comprising a pigment as a colorant, an anionic surfactant having a polyoxyethylene group, a dispersant, and water, wherein said recording medium comprises a substrate bearing a layer comprising a water soluble resin. According to a preferred embodiment, the ink composition may further comprise a resin emulsion and/or a saccharide. In the Examples, for example polyoxyethylene nonyplhenyl ether ammonium sulphate is being used as anionic surfactant and maltitol as saccharide. Furthermore a coloured organic pigment is used in the Examples.

U.S. Pat. No. 6,394,594 discloses an ink for ink-jet recording comprising a colouring material, a liquid material and at least one selected from the group consisting of polyolphosphates and salts thereof.

The known systems based on a char forming compound have the disadvantage that their laser-sensitivity is relatively low.

It is an object of the present invention to provide a coating composition based on a char forming compound, which shows improved sensitivity and yields high contrast coloured markings of any desired colour on exposure to energy.

These objects are solved according to a first aspect of the invention by a coating composition comprising a char forming compound as a first compound capable of forming a coloured substance upon exposition to energy; at least one latent activator selected from the group consisting of ammonium phosphate, ammonium polyphosphate, ammonium sulfite, ammonium thiosulfate, ammonium sulfamate and ammonium sulfate; and a second compound capable of forming a coloured substance upon exposition to energy selected from the group consisting of colour formers, oxygen containing transition metal compounds, and metal-chelate-type colour forming systems.

In the context of the present invention, the first compound can be one or more first compounds while the second compound can be one or more second compounds.

The above objects are moreover solved according to a second aspect by a coating composition comprising a char forming compound as a first compound capable of forming a coloured substance upon exposition to energy; and a second compound capable of forming a coloured substance upon exposition to energy selected from the group consisting of colour formers and metal-chelate-type colour forming systems.

In a preferred embodiment of the second aspect of the invention, the coating composition comprises at least one latent activator selected from the group consisting of ammonium phosphate, ammonium polyphosphate, ammonium sulfite, ammonium thiosulfate, ammonium sulfamate and ammonium sulfate.

The compositions of the present invention thus comprise at least one char forming compound. A char forming compound is a compound which forms char upon energy treatment. Generally, a char forming compound is of high carbon and oxygen content.

Examples of char forming compounds are carbohydrates such as monosaccharides, disaccharides and polysaccharides, and derivatives thereof, wherein the carbonyl group has been reduced to a hydroxyl group, so-called sugar alcohols.

Examples of monosaccharides are glucose, mannose, galactose, arabinose, fructose, ribose, erythrose and xylose. Examples of disaccharides are maltose, cellobiose, lactose and saccharose. Examples of polysaccharides are cellulose, starch, gum arabic, dextrin and cyclodextrin. Examples of sugar alcohols are meso-erythritol, sorbitol, mannitol and pentaerythritol.

In addition to these compounds, a malonate or a compound having the partial formula —CH(OH)CH(OH)CH(OH)COO$^-$ as disclosed in WO 2006/129078 A1, for example a gluconate or a heptonate, may be used. Moreover, an alginate as disclosed in WO 2006/129086 A1, for example sodium alginate, may also be used.

Preferred char forming compounds are monosaccharides and disaccharides. More preferred char forming compounds are saccharose and galactose. The most preferred char forming compound is saccharose (to be referred to also as sucrose).

The at least one latent activator which is present in the coating composition according to the first aspect of the invention and in a preferred embodiment of the coating composition according to the second aspect of the invention is selected from the group consisting of ammonium phosphate, ammonium polyphosphate (for example EXOLIT® AP 420 from Clariant), ammonium sulfite, ammonium thiosulfate, ammonium sulfamate and ammonium sulfate. Preferably, the latent activator is at least one selected from the group consisting of ammonium phosphate and ammonium sulfate.

The composition of the present invention may comprise additional activators which are different from the aforementioned activators and can be either an acid derivative or a salt of an acid and an amine.

The acid derivative can be any derivative of an acid having a pKa in water at 25° C. of below 10.0. Preferably, it is a derivative of an acid having a pKa of below 5.0, more preferably of below 3.0.

Preferred acid derivatives are derivatives of sulfuric acids, phosphoric acids or carboxylic acids.

Examples of sulfuric acids are sulfuric acid, fluorosulfuric acid, chlorosulfuric acid, nitrosylsulfuric acid, 4-styrene sulfonic acid, p-toluenesulfonic acid, benzene sulfonic acid, xylene sulfonic acid, phenol sulfonic acid, methane sulfonic acid, trifluormethane sulfonic acid, poly(4-styrene sulfonic acid) and copolymers comprising 4-styrene sulfonic acid units such as poly(4-styrenesulfonic acid-co-maleic acid). Examples of phosphoric acids are phosphoric acid, fluorophosphoric acid and hexafluorophosphoric acid. Examples of carboxylic acids are dichloroacetic acid, trichloroacetic acid, oxalic acid and maleic acid. More preferred acid derivatives are ester, amide and thioester derivatives of sulfuric acids, phosphoric acids or carboxylic acids.

Ester, amide and thioester derivatives of sulfuric acids, phosphoric acids or carboxylic acids can be sulfuric acids, phosphoric acids or carboxylic acids having at least one OH-group substituted with $OR^1$, $NR^2R^3$ or $SR^4$, wherein $R^1$, $R^2$, $R^3$ and $R^4$ can be $C_{1-30}$-alkyl, $C_{2-30}$-alkenyl, $C_{4-8}$-cycloalkyl, $C_{7-12}$-bicycloalkyl, $C_{5-8}$-cycloalkenyl, aralkyl, aralkenyl or aryl, which can be unsubstituted or substituted with $C_{1-6}$-alkyl, $C_{1-6}$-alkoxy, halogen, hydroxyl, $C(O)OC_{1-6}$-alkyl or $OC(O)C_{1-6}$-alkyl.

Ester, amide and thioester derivatives of sulfuric acids, phosphoric acids or carboxylic acids can also be two acids, selected from the group consisting of sulfuric acids, phosphoric acids and carboxylic acids, being linked by an O-A-O, $NR^5$-E-$R^6N$ or S-J-S group, wherein $R^5$ and $R^6$ can be as defined for $R^1$, $R^2$, $R^3$ and $R^4$, and A, E and J can be $C_{2-14}$-alkylene, $C_{2-14}$-alkenylene, $C_{4-8}$-cycloalkylene, $C_{4-8}$-cycloalkenylene or arylene, which can be unsubstituted or substituted with $C_{1-6}$-alkyl, $C_{1-6}$-alkoxy, halogen, hydroxyl, $C(O)OC_{1-6}$-alkyl or $OC(O)C_{1-6}$-alkyl.

Examples of $C_{1-30}$-alkyl are methyl, ethyl, propyl, isopropyl, butyl, sec-butyl, isobutyl, tert-butyl, pentyl, hexyl, heptyl, octyl, nonyl, decyl, undecyl, dodecyl, myristyl, palmityl, stearyl and arachinyl. Examples of $C_{2-30}$-alkenyl are vinyl, allyl, linolenyl, docosahexaenoyl, eicosapentaenoyl, linoleyl, arachidonyl and oleyl. Examples of $C_{4-8}$-cycloalkyl are cyclopentyl and cyclohexyl. An example of a $C_{7-12}$-bicycloalkyl is 2-norbornyl. An example of $C_{5-8}$-cycloalkenyl is cyclohexenyl. Examples of aralkyl are benzyl and 2-phenylethyl. Examples of aryl are phenyl, 1,3,5-triazinyl or naphthyl. Examples of $C_{1-6}$-alkyl are methyl, ethyl, propyl, isopropyl, butyl, sec-butyl, isobutyl, tert-butyl, pentyl, and hexyl. Examples of $C_{1-6}$-alkoxy are methoxy, ethoxy, propoxy, isopropoxy, butoxy, sec-butoxy, tert-butxy, isobutoxy, pentoxy and hexoxy. Examples of halogens are chlorine and bromine. Examples of $C_{2-14}$-alkylene are ethylene, trimethylene, tetramethylene, ethylethylene, pentamethylene, hexamethylene, heptamethylene and octamethylene. Examples of $C_{4-8}$-cycloalkylene are cyclopentylene and cyclohexylene. Examples of $C_{4-8}$-cycloalkenylene are cyclopentenylene and cyclohexenylene. An example of arylene is phenylene.

Preferred $C_{1-30}$-alkyls are $C_{1-6}$-alkyls and preferred $C_{2-30}$-alkenyls are $C_{2-6}$-alkenyls. Examples of $C_{2-6}$-alkenyls are vinyl and allyl.

Even more preferred acid derivatives are ester, amide and thioester derivatives of sulfuric acids. Especially preferred acid derivatives are ester derivatives of sulfuric acids, in particular of organic sulfuric acids.

Examples of organic sulfuric acids are 4-styrene sulfonic acid, p-toluenesulfonic acid, benzene sulfonic acid, xylene sulfonic acid, phenol sulfonic acid, methane sulfonic acid, trifluormethane sulfonic acid, poly(4-styrene sulfonic acid) and copolymers comprising 4-styrene sulfonic acid units such as poly(4-styrenesulfonic acid-co-maleic acid).

Preferred ester derivatives of organic sulfuric acids are organic sulfuric acids having at least one OH-group substituted with $OR^1$, wherein $R^1$ can be $C_{1-6}$-alkyl or $C_{4-8}$-cycloalkyl, which can be unsubsituted or substituted with $C_{1-6}$-alkyl or $C(O)OC_{1-6}$-alkyl. Preferred ester derivatives of organic sulfuric acids are also two sulfuric acids being linked by an O-A-O group, wherein A is $C_{4-8}$-cycloalkylene. A preferred organic sulfonic acid is p-toluenesulfonic acid.

More preferred ester derivatives of organic sulfuric acids are cyclohexyl-p-toluenesulfonate, 2-methylcyclohexyl-p-toluenesulfonate, menthyl-p-toluenesulfonate, 1,4-cyclohexanediol di-p-toluenesulfonate, 4-tosylcyclohexanecarboxylic acid ethyl ester and 2,2-dimethylpropyl-p-toluenesulfonate.

The acid derivatives are either commercially available or can be prepared by known processes, e.g. by the reaction of a suitable alcohol with a suitable sulfonyl chloride in the presence of a catalyst.

The acid can have a pKa in water at 25° C. of below 10.0. Preferably, it has a pKa of below 5.0, more preferably of below 3.0.

Preferred acids are sulfuric acids, phosphoric acids or carboxylic acids. More preferred acids are sulfuric acids. Most preferred acids are organic sulfuric acids.

The amine can be of formula $NR^7R^8R^9$, wherein $R^7$, $R^8$ and $R^9$ can be the same or different and can be hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl, which can be unsubstituted or substituted with amino and/or hydroxy, or $R^8$ and $R^9$, together with the nitrogen of the amine, form a 5- to 7-membered ring.

Examples of amines of formula $NR^7R^8R^9$ are ammonia, methylamine, ethylamine, propylamine, butylamine, diethylamine, ethylene diamine, 1,2-diaminopropane, ethanolamine, cyclohexylamine, aniline, melamine, pyrrole, morpholine, pyrrolidine and piperidine.

Preferably, the amine is of formula $NR^7R^8R^9$, wherein $R^7$ is hydrogen and $R^8$ and $R^9$ can be the same or different and can be hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl, which can be unsubstituted or substituted with amino and/or hydroxy, or $R^8$ and $R^9$, together with the nitrogen of the amine, form a 5- to 7-membered ring.

More preferably, the amine is of formula $NR^7R^8R^9$, wherein $R^7$ and $R^8$ are hydrogen and $R^9$ can be hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl, which can be unsubstituted or substituted with amino and/or hydroxy.

The coating composition of the present invention comprises a second compound capable of forming a coloured substance upon exposition to energy selected from the group consisting of colour formers, oxygen containing transition metal compounds, and metal-chelate-type colour forming systems.

The colour former generally comprises an electron donating leuco dye and an electron accepting developer.

The colour former can be any suitable colour former such as a phthalide, a fluoran, a triarylmethane, a benzoxazine, a quinazoline, a spiropyran, a quinone, a leucozine such as a thiazine respectively an oxazine or mixtures thereof.

Examples of phthalides are crystal violet lactone (3,3-bis(p-dimethylaminophenyl)-6-dimethylaminophtalide), 3,3-bis(p-dimethylaminophenyl)phthalide, 3,3-bis(1-ethyl-2-methylindol-3-yl)phthalide, 3,3-bis(1-octyl-2-methylindol-3-yl)phthalide, 3-(4-diethylaminophenyl)-3-(1-ethyl-2-methylindol-3-yl)-phthalide, 7-(N-ethyl-N-isopentylamino)-3-methyl-1-phenylspiro[4H-chromeno[2,3-c]pyrazole-4(1H)-3'-phthalide, 3,6,6'-tris(dimethylamino)spiro[fluorene-9,3'-phthalide], 3,6,6'-tris(diethylamino)spiro[fluorene-9,3'-phthalide], 3,3-bis-[2-(p-dimethylaminophenyl)-2-(p-methoxypheny)pethenyl-4,5,6,7-tetrabromophthalide, 3,3-bis-[2-(p-dimethylaminophenyl)-2-(p-methoxypheny)pethenyl-4,5,6,7-tetrachlorophthalide, 3,3-bis[1,1-bis(4-pyrrolidinophenyl)ethylene-2-yl]-4,5,6,7-tetrabromophthalide, 3,3-bis-[1-(4-methoxyphenyl)-1-(4-pyrridinopheny)pethylene-2-yl]-4,5,6,7-tetrachlorophthalide, 3-(4-diethylamino-2-ethoxyphenyl)-3-(1-ethyl-2-methylindol-3-yl)-4-azaphthalide, 3-(4-diethylamino-2-ethoxyphenyl)-3-(1-octyl-2-methylindol-3-yl)-4-azaphthalide and 3-(4-cyclohexylethylamino-2-methoxyphenyl)-3-(1-ethyl-2-methylindol-3-yl)-4-azaphthalide The phthalides can be prepared by methods known in the art, for example crystal violet lactone can be prepared as described in GB 1,347,467, and 3,3-bis(1-ethyl-2-methylindol-3-yl)phthalide can be prepared as described in GB 1,389,716.

Examples of fluorans are 3-di(ethyl)amino-6-methyl-7-(tert-butoxycarbonyl)anilinofluoran, 3-diethylamino-7-dibenzylaminofluoran, 3-dibutylamino-7-dibenzylaminofluoran, 3-diethylamino-6-methyl-7-(dibenzylamino)fluoran, 3-diethylamino-6-methylfluoran, 3-diethylamino-6-chloro-7-methylfluoran, 3-diethylamino-6-methyl-7-chlorofluoran, 3-diethylamino-7-tert-butylfluoran, 3-diethylamino-7-carboxyethylfluoran, 3-diethylamino-7-methylfluoran, 3-diethylamino-6,8-dimethylfluoran, 3-diethylamino-7-chlorofluoran, 3-dibutylamino-6-methylfluoran, 3-cyclohexylamino-6-chlorofluoran, 3-diethylamino-benzo[a]fluoran, 3-diethylamino-benzo[c]fluoran, 3-dimethylamino-6-methyl-7-anilinofluoran, 3-diethylamino-6-methyl-7-anilinofluoran, 3-diethylamino-6-methyl-7-(2,4-dimethylanilino)fluoran, 3-diethylamino-6-methyl-7-(3-trifluoromethylanilino)fluoran, 3-diethylamino-6-methyl-7-(2-chloroanilino)fluoran, 3-diethylamino-6-methyl-7-(p-chloroanilino)fluoran, 3-diethylamino-6-methyl-7-(2-fluoroanilino)fluoran, 3-diethylamino-6-methyl-7-(p-octylanilino)fluoran, 3-diethylamino-7-(p-octylanilino)fluoran, 3-diethylamino-6-methyl-7-(p-methylanilino)fluoran, 3-diethylamino-6-ethoxyethyl-7-anilinofluoran, 3-diethylamino-6-methyl-7-(3-methylanilino)fluoran, 3-diethylamino-7-(3-trifluoromethylanilino)fluoran, 3-diethylamino-7-(2-chloroanilino)fluoran, 3-diethylamino-7-(2-fluoroanilino)fluoran, 3-diethylamino-6-chloro-7-anilinofluoran, 3-dibutylamino-6-methyl-7-anilinofluoran, 3-dibutylamino-6-methyl-7-(2,4-dimethylanilino)fluoran, 3-dibutylamino-6-methyl-7-(2-chloroanilino)fluoran, 3-dibutylamino-6-methyl-7-(4-chloroanilino)fluoran, 3-dibutylamino-6-methyl-7-(2-fluoroanilino)fluoran, 3-dibutylamino-6-methyl-7-(3-trifluoromethylanilino)fluoran, 3-dibutylamino-6-ethoxyethyl-7-anilinofluoran, 3-dibutylamino-6-chloro-anilinofluoran, 3-dibutylamino-6-methyl-7-(4-methylanilino)fluoran, 3-dibutylamino-7-(2-chloroanilino)fluoran, 3-dibutylamino-7-(2-fluoroanilino)fluoran, 3-dipentylamino-6-methyl-7-anilinofluoran, 3-dipentylamino-6-methyl-7-(4-2-chloroanilino)fluoran, 3-dipentylamino-7-(3-trifluoromethylanilino)fluoran, 3-dipentylamino-6-chloro-7-anilinofluoran, 3-dipentylamino-7-(4-chloroanilino)fluoran, 3-pyrrolidino-6-methyl-7-anilinofluoran, 3-piperidino-6-methyl-7-anilinofluoran, 3-(N-methyl-N-propylamino)-6-methyl-7-anilinofluoran, 3-(N-methyl-N-cyclohexylamino)-6-methyl-7-anilinofluoran, 3-(N-ethyl-N-cyclohexylamino)-6-methyl-7-anilinofluoran, 3-(N-ethyl-N-hexylamino)-7-anilinofluoran, 3-(N-ethyl-p-toluidino)amino-6-methyl-7-anilinofluoran, 3-(N-ethyl-p-toluidino)amino-7-methylfluoran, 3-(N-ethyl-N-isoamylamino)-6-methyl-7-anilinofluoran, 3-(N-ethyl-N- isoamylamino)-7-(2-chloroanilino)fluoran, 3-(N-ethyl-N-isoamylamino)-6-chloro-7-anilinofluoran, 3-(N-ethyl-N-tetrahydrofurfurylamino)-6-methyl-7-anilinofluoran, 3-(N-ethyl-N-isobutylamino)-6-methyl-7-anilinofluoran, 3-(N-butyl-N-isoamylamino)-6-methyl-7-anilinofluoran, 3-(N-isopropyl-N-3-pentylamino)-6-methyl-7-anilinofluoran, 3-(N-ethyl-N-ethoxypropylamino)-6-methyl-7-anilinofluoran, 2-methyl-6-p-(p-dimethylaminophenyl)aminoanilinofluoran, 2-methoxy-6-p-(p-dimethylaminophenyl)aminoanilinofluoran, 2-chloro-3-methyl-6-p-(p-phenylaminophenyl)aminoanilinofluoran, 2-diethylamino-6-p-(p-dimethylaminophenyl)aminoanilinofluoran, 2-phenyl-6-methyl-6-p-(p-phenylaminophenyl)aminoanilinofluoran, 2-benzyl-6-p-(p-phenylaminophenyl)aminoanilinofluoran, 3-methyl-6-p-(p-dimethylaminophenyl)aminoanilinofluoran, 3-diethylamino-6-p-(p-diethylaminophenyl)aminoanilinofluoran, 3-diethylamino-6-p-(p-dibutylaminophenyl)aminoanilinofluoran and 2,4-dimethyl-6-[(4-dimethylamino)anilino]fluoran.

The fluorans can be prepared by methods known in the art, for example 3-diethylamino-7-dibenzylaminofluoran, 3-diethylamino-7-tert-butylfluoran, 3-diethylamino-6-methyl-7-anilinofluoran and 3-diethylamino-6-methyl-7-(2,4-dimethylanilino)fluoran and can be prepared as described in U.S. Pat. No. 5,166,350 A, 3-diethylamino-6-methyl-7-(3-methylanilino)fluoran can be prepared as described in EP 0 546 577 A1, 3-diethylamino-6-chloro-7-anilinofluoran can be prepared as described in DE 2130845, 3-pyrrolidino-6-methyl-7-anilinofluoran and 3-piperidino-6-methyl-7-anilinofluoran can be prepared as described in U.S. Pat. No. 3,959,571 A, 3-(N-ethyl-N-isoamylamino)-6-methyl-7-anilinofluoran can be prepared as described in GB 2 002 801 A, and 3-(N-methyl-N-propylamino)-6-methyl-7-anilinofluoran can be prepared as described in GB 2 154 597 A.

Examples of benzoxazines are 2-phenyl-4-(4-diethylaminophenyl)-4-(4-methoxyphenyl)-6-methyl-7-dimethylamino-3,1-benzoxazine, which can be prepared as described in EP 0 187 329 A1, and 2-phenyl-4-(4-diethylaminophenyl)-4-(4-methoxyphenyl)-8-methyl-7-dimethylamino-3,1-benzoxazine.

An example of a quinazoline is 4,4'-[1-methylethylidene)bis(4,1-phenyleneoxy-4,2-quinazolinediyl)]bis[N,N-diethylbenzeneamine]. An example of a triarylmethane is bis(N-methyldiphenylamine)-4-yl-(N-butylcarbazole)-3-yl-methane, which can be prepared as described in GB 1,548,059.

Examples of spiropyrans are 1',3',3'-trimethylspiro[2H-1-benzopyran-2,2'-indoline], 1,3,3-trimethylspiro[indoline-2,3'-[3H]naphth[2,1-b][1,4]oxazine] and 1',3',3'-trimethylspiro-[2H-1-benzothiopyran-2,2'-indoline].

An example of a quinone is hematoxyline. An example of an oxazine is 3,7-bis(dimethylamino)-10-benzoylphenoxazine. An example of a thiazine is 3,7-bis(dimethylamino)-10-benzoylphenothiazine.

Preferably, the colour former is a phthalide or a fluoran or mixtures thereof.

More preferably, the colour former is crystal violet lactone or 3,3-bis(p-dimethylaminophenyl)-6-dimethylaminophthalide (as sold for example under the tradename Ciba® Pergascript® Blue I-2RC), 3-(4-diethylamino-2-ethoxyphenyl)-3-(1-octyl-2-methylindol-3-yl)-4-azaphthalide (as sold for example under the tradeneme Ciba® Pergascript® Blue I-2G), 3,3-bis(1-octyl-2-methylindol-3-yl)phthalide (as sold for example under the tradename Ciba® Pergascript® Red 1-6B), 3-diethylamino-6-(ethoxycarbonyl)-fluoran (as sold for example under the tradename Ciba® Pergascript® Orange I-G), 3-dibutylamino-6-methyl-7-anilinofluoran (as sold for example under the tradename Ciba® Pergascript® Black 2C) or 3-diethylamino-6-methyl-7-anilinofluoran (as sold for example under the tradename Ciba® Pergascript® Black 1C).

Preferred colour former compounds contain lactone groups. Their colour change is thus based upon a lactone ring opening mechanism. Other preferred colour formers contain triarylmethane groups; their colour change is based upon an oxidative mechanism.

The most preferred colour formers are 3-dibutylamino-6-methyl-7-anilinofluoran (as sold for example under the tradename Ciba® Pergascript®Black 2C) or 3-diethylamino-6-methyl-7-anilinofluoran (as sold for example under the tradename Ciba® Pergascript® Black 1C).

Suitable colour developers for use with the above colour formers include 2,2-bis(4-hydroxyphenyl)propane (bis phenol A), 2,2-bis(4'-hydroxyphenyl)-4-methylpentane, benzyl-4-hydroxybenzoate, 4,4'-dihydroxydiphenylsulfone, 2,4'-dihydroxydiphenylsulfone, 4-hydroxy-4'-isopropoxydiphenylsulfone (as sold for example under the tradename D8), 2,2'-diallyl-4,4'-sulfonyldiphenol (as sold for example under the tradename TG-SA), phenol, 4,4'-sulfonyl-bis-polymer with 1,1'-oxobis(2-chloroethane) (as sold for example under the tradename D90), N-(p-toluenesulfonyl)-N'-3-(p-toluenesulfonyloxyphenyl)urea (as sold for example under the tradename Ciba® Pergafast® 201), 4-[(4-(1-methylethoxy)phenyl)sulfonyl]-phenol and carbamic acid, N,N'-[sulfonylbis[4,1-phenyleneiminocarbonylimino(methylphenylene)]]bis-,C,C'-diphenyl ester (as sold by Asahi Denka Kogyo under the tradename UU), 4,4'-bis(p-toluenesulphonylaminocarbonylamino)diphenylmethane):(as sold for example under the tradename B-TUM), zinc bis[(4-n-octyloxycarbonylamino)salicylate]dihydrate (as sold for example under the tradename SZ-110), 4-hydroxybenzoate derivative of a polypentaerythritol compound with CAS number 378244-93-0 as sold for example by Asahi Denka Kogyo under the tradename K5, and mixtures thereof.

Preferred developers are selected from among sulfonylurea derivatives (for example Pergafast® 201, B-TUM), 4,4'-Bisphenol sulfone, K5 developer, D90 developer, UU developer, $ZnCl_2$ and ammonium stearate.

In a preferred embodiment of the present coating composition, the coating composition may contain in addition to a colour former and possibly a developer also a sensitiser.

Suitable sensitisers include stearamide, amide waxes, 1,2-diphenoxyethane, 1,2-bis(3-methylphenoxy)ethane, benzyl-2-naphthyl ether, dibenzyl oxalate and di-(4-methylbenzyl) oxalate.

The composition of the present invention may contain as a second compound capable of forming a coloured substance upon exposition to energy an oxygen containing transition metal compound.

The oxygen containing transition metal compound is preferably selected from the group consisting of oxygen containing chromium, molybdenum, tungsten, and titanium compounds.

In a particularly preferred embodiment, the oxygen containing transition metal compound is selected from the group consisting of oxygen containing chromium, molybdenum and tungsten compounds.

Examples of oxygen containing chromium, molybdenum and tungsten compounds are chromium, molybdenum and tungsten oxides, alkali metal, earth alkaline metal, ammonium and mono-, di-, tri- and tetra-$C_{1-8}$-alkylammonium mono-, di- and polychromates, -molbydates and -tungstates, alkali metal, earth alkaline metal, ammonium and mono-, di-, tri- and tetra-$C_{1-8}$-alkylammonium heteropolychromates, -molybdates and -tungstates, alkali metal, earth alkaline metal, ammonium and mono-, di-, tri- and tetra-$C_{1-8}$-alkylammonium peroxo chromates, -molybdates and -tungstates, and hydroxyl containing chromates, molybdates and tungstates.

Examples of $C_{1-8}$-alkyl are methyl, ethyl, propyl, isopropyl, butyl, isobutyl, sec-butyl, tert-butyl, pentyl, hexyl, heptyl, octyl and 2-ethylhexyl.

Examples of chromium, molybdenum and tungsten oxides are chromium(III) oxide, chromium(VI) oxide, molybdenum (IV) oxide, molybdenum(VI) oxide, tungsten(IV) oxide and tungsten(VI) oxide.

Examples of alkali metal, earth alkaline metal, ammonium and mono-, di-, tri- and tetra-$C_{1-8}$-alkylammonium mono-, di- and polychromates, -molybdates and -tungstates are ammonium chromate, potassium chromate, magnesium chromate, ammonium dichromate, sodium dichromate, potassium dichromate, ammonium molybdate, sodium molybdate, potassium molybdate, magnesium molybdate, calcium molybdate, ammonium dimolybdate, ammonium heptamolybdate, ammonium octamolybdate, ammonium decamolybdate, ammonium tungstate, sodium tungstate, potassium tungstate, magnesium tungstate, calcium tungstate, ammonium metatungstate, sodium metatungstate and ammonium paratungstate.

Polychromates, molybdates and tungstates can also be called isopolychromates, -molybdates and -tungstates.

Examples of alkali metal, earth alkaline metal, ammonium and mono-, di-, tri- and tetra-$C_{1-8}$-alkylammonium heteropolychromates, -molybdates and -tungstates are $[Fe^{III}(Mo_6O_{24})]^{9-}$, $[(Te^{VI}(Mo_6O_{24})]^{6-}$, $[I^{VII}(Mo_6O_{24})]^{5-}$, $[Cr^{III}(Mo_6O_{24}H_6)]^{3-}$, $[Mn^{IV}(Mo_9O_{32})]^{6-}$, $[Ni^{IV}(Mo_9O_{32})]^{6-}$, $[(P^V(Mo_{12}O_{40})]^{3-}$, $[(Si^{IV}(Mo_{12}O_{40})]^{4-}$, $[(S^{IV}(Mo_{12}O_{40})]^{4-}$, $[(Ce^{IV}(Mo_{12}O_{42})]^{8-}$, $[I(W_6O_{24})]^{5-}$, $[Te(W_6O_{24})]^{6-}$, $[P(W_{12}O_{40})]^{3-}$ and $[Si(W_{12}O_{40})]^{4-}$ having sodium, potassium, magnesium, calcium or ammonium or mixtures thereof as countercation.

Examples of hydroxyl containing chromates, molybdates and tungstates are chromium(III) hydroxide, chromium(II) hydroxide and hexahydroxymolybdate.

Oxygen containing chromium, molybdenum or tungsten compounds are either commercially available or can be prepared by methods known in the art.

More preferably, the oxygen containing transition metal compound is selected from the group consisting of alkali metal, earth alkaline metal, ammonium and mono-, di-, tri- and tetra-$C_{1-8}$-alkylammonium mono-, di- and polychromates, -molybdates and -tungstates.

Most preferably, the oxygen containing transition metal compound is selected from the group consisting of alkali metal, ammonium and mono-, di-, tri- and tetra-$C_{1-8}$-alkylammonium mono-, di- and polymolybdates and -tungstates. Examples of alkali metal and ammonium mono-, di- and polymolybdates and -tungstates are ammonium molybdate, sodium molybdate, potassium molybdate, ammonium dimolybdate, ammonium heptamolybdate, ammonium octamolybdate, ammonium decamolybdate, ammonium tungstate, sodium tungstate, potassium tungstate, ammonium metatungstate, sodium metatungstate and ammonium paratungstate.

The use of ammonium octamolybdate (AOM) is particularly preferred. AOM can be seen as a catalyst for the color change reaction of char forming compounds. Moreover, it can be a catalyst to trigger color former systems and it is an IR absorber for the $CO_2$ laser.

In an alternative embodiment the oxygen containing transition metal compound is a titanium oxide, preferably in the anatase form. Titanium dioxide in the anatase form (also called octahedrite), a tetragonal mineral of dipyramidal habit, occurs in nature. The titanium dioxide in the anatase form can have a particle size in the range of 0.001 to 1000 μm (1 nm to 1 mm). Preferably, the particle size is in the range of 0.01 to 10 μm, more preferably, it is in the range of 0.01 to 1 μm, most preferably it is in the range of 0.01 to 0.5 μm.

The oxygen containing transition metal compound may also be a mixture of a number of different transition metals and their oxygen containing oxides and/or salts as described in WO 2005/068207. For instance, copper and molybdenum or copper and tungsten oxide binary metal salts may be used.

The second compound capable of forming a coloured substance upon exposition to energy can be a metal-chelate-type colour forming system.

Metal-chelate-type colour forming systems may comprise double salts of higher fatty acids as one of the components of the system. Examples are iron-zinc double salt of stearic acid, iron-zinc double salt of montanic acid, iron-zinc double salt of acid wax, iron-zinc double salt of behenic acid, iron-calcium double salt of behenic acid, iron-aluminum double salt of behenic acid, iron-magnesium double salt of behenic acid, silver-calcium double salt of behenic acid, silver-magnesium double salt of behenic acid, calcium-aluminium double salt of behenic acid, which are used either alone or with other double salts.

With these double salts, polyvalent hydroxyaromatic compounds, diphenylkarbazide, diphenylkarbazone, hexamethylenetetramine, spirobenzopyran, 1-formyl-4-phenylsemicarbazide, etc. are used for color formation.

The first compound and the second compound capable of forming a coloured substance upon exposition to energy may be used alone or in combination.

In addition, the coating composition may comprise other color change systems which may be based on other mechanisms.

Preferably, the composition also comprises a solvent. The solvent can be water, an organic solvent (preferably an organic solvent different from a polyhydric alcohol, like especially a polyhydric alcohol having at least 5 carbon atoms, e.g. pentaerythritol or sorbitol), a liquid monomer or mixtures thereof. Preferably, the solvent is water, an organic solvent different from a polyhydric alcohol, like especially a polyhydric alcohol having at least 5 carbon atoms, e.g. pentaerythritol or sorbitol, or mixtures thereof.

Examples of organic solvents are $C_{1-4}$-alkanols, $C_{2-4}$-polyols, $C_{3-6}$-ketones, $C_{4-6}$-ethers, $C_{2-3}$-nitriles, nitromethane, dimethylsulfoxide, dimethylformamide, dimethylacetamide, N-methyl pyrolidone and sulfolane, wherein $C_{1-4}$-alkanols and $C_{2-4}$-polyols may be substituted with $C_{1-4}$-alkoxy. Examples of $C_{1-4}$-alkanols are methanol, ethanol, propanol, isopropanol or butanol, isobutanol, sec-butanol and tert-butanol. Examples of $C_{1-4}$-alkoxyderivatives thereof are 2-ethoxyethanol and 1-methoxy-2-propanol. Examples of $C_{2-4}$-polyols are glycol and glycerol. Examples of $C_{3-6}$-ketones are acetone and methyl ethyl ketone. Examples of $C_{4-6}$-ethers are dimethoxyethane, diisopropylethyl and tetrahydrofurane. An example of a $C_{2-3}$-nitrile is acetonitrile.

Preferred examples of organic solvents are $C_{1-4}$-alkanols, $C_{3-6}$-ketones, $C_{4-6}$-ethers, $C_{2-3}$-nitriles, nitromethane, dimethylsulfoxide, dimethylformamide, dimethylacetamide, N-methyl pyrolidone and sulfolane, wherein $C_{1-4}$-alkanols may be substituted with $C_{1-4}$-alkoxy.

More preferably, the solvent is water or a mixture of water and an organic solvent which is preferably different from a polyhydric alcohol, like especially a polyhydric alcohol having at least 5 carbon atoms, e.g. pentaerythritol or sorbitol Preferably, the organic solvent is selected from the group consisting of $C_{1-4}$-alkanols, $C_{2-4}$-polyols, $C_{3-6}$-ketones, dimethylformamide and dimethylacetamide, wherein $C_{1-4}$-alkanols and $C_{2-4}$-polyols may be substituted by $C_{1-4}$-alkoxy.

More preferably, the organic solvent is selected from the group consisting of $C_{1-4}$-alkanols, $C_{3-6}$-ketones, dimethylformamide and dimethylacetamide, wherein $C_{1-4}$-alkanols may be substituted by $C_{1-4}$-alkoxy.

Preferably, the ratio of water/organic solvent of the mixture of water and organic solvent is at least 1/2, and more preferably, at least 1/1.

Most preferably, the solvent is water.

Preferably, the composition of the present invention also comprises a polymeric binder.

Examples of polymeric binders are acrylic polymers, styrene polymers and hydrogenated products thereof, vinyl polymers and derivatives thereof, polyolefins and hydrogenated or epoxidized products thereof, aldehyde polymers, epoxide polymers, polyamides, polyesters, polyurethanes, sulfone-based polymers and natural polymers and derivatives thereof. The polymeric binder can also be a mixture of polymeric binders. It can also be a mixture of liquid monomers and a suitable photoinitiator that forms one of the above listed polymeric binders under UV irradiation after coating. In this case, the monomers function as the solvent.

Acrylic polymers are polymers formed from at least one acrylic monomer or from at least one acrylic monomer and at least one other ethylenically unsaturated polymer such as a styrene monomer, vinyl monomer, olefin monomer or maleic monomer.

Examples of acrylic monomers are (meth)acrylic acid or salts thereof, (meth)acrylamide, (meth)acrylonitrile, $C_{1-6}$-alkyl (meth)acrylates such as ethyl (meth)acrylate, butyl (meth)acrylate or hexyl (meth)acrylate, 2-ethylhexyl (meth)acrylate, substituted $C_{1-6}$-alkyl (meth)acrylates such as glycidyl methacrylate and acetoacetoxyethyl methacrylate, di($C_{1-4}$-alkylamino)$C_{1-6}$-alkyl (meth)acrylates such as dimethylaminoethyl acrylate or diethylaminoethyl acrylate, amides formed from $C_{1-6}$-alkylamines, substituted $C_{1-6}$-alkylamines such as 2-amino-2-methyl-1-propane sulfonic acid, ammonium salt, or di($C_{1-4}$-alkyl-amino)$C_{1-6}$-alkylamines and (meth)acrylic acid and $C_{1-4}$-alkyl halide adducts thereof.

Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluoroethylene. Examples of maleic monomers are maleic acid, maleic anhydride and maleimide. Examples of acrylic polymers are poly(methyl methacrylate) and poly(butyl methacrylate), as well as carboxylated acrylic copolymers as sold for example by Ciba under the tradenames Ciba® Glascol® LE15, LS20 and LS24, styrene acrylic copolymers as sold for example by Ciba under the tradenames Ciba® Glascol® LS26 and Ciba® Glascol® C44, and polyacrylic acid polymers as sold for example by Ciba under the tradename Ciba® Glascol® E11.

Styrene polymers are polymers formed from at least one styrene monomer and at least one vinyl monomer, olefin monomer and/or maleic monomer. Examples of styrene polymers are styrene butadiene styrene block polymers, styrene ethylene butadiene block polymers, styrene ethylene propylene styrene block polymers and styrene-maleic anhydride copolymers.

Vinyl polymers are polymers formed from at least one vinyl monomer or from at least one vinyl monomer and at least one olefin monomer or maleic monomer. Examples of vinyl polymers are polyvinyl chloride, polyvinylalcohol, polyvinylacetate, partially hydrolysed polyvinyl acetate and methyl vinyl ether-maleic anhydride copolymers. Examples of derivatives thereof are carboxy-modified polyvinyl alcohol, acetoacetyl-modified polyvinyl alcohol, diacetone-modified polyvinyl alcohol and silicon-modified polyvinyl alcohol.

Polyolefins are polymers formed from at least one olefin monomer or from at least one olefin monomer or maleic monomer. Examples of polyolefines are polyethylene, polypropylene, polybutadiene and isopropylene-maleic anhydride copolymer.

Aldehyde polymers are polymers formed from at least one aldehyde monomer or polymer and at least one alcohol monomer or polymer, amine monomer or polymer and/or urea monomer or polymer. Examples of aldehyde monomers are formaldehyde, furfural and butyral. Examples of alcohol monomers are phenol, cresol, resorcinol and xylenol. An example of polyalcohol is polyvinyl alcohol. Examples of amine monomers are aniline and melamine. Examples of urea monomers are urea, thiourea and dicyandiamide. An example of an aldehyde polymer is polyvinyl butyral formed from butyral and polyvinylalcohol.

Epoxide polymers are polymers formed from at least one epoxide monomer and at least one alcohol monomer and/or amine monomer. Examples of epoxide monomers are epichlorhydrine and glycidol. Examples of alcohol monomers are phenol, cresol, resorcinol, xylenol, bisphenol A and glycol. An example of epoxide polymer is phenoxy resin, which is formed from epichlorhydrin and bisphenol A.

Polyamides are polymers formed from at least one monomer having an amide group or an amino as well as a carboxy group or from at least one monomer having two amino groups and at least one monomer having two carboxy groups. An example of a monomer having an amide group is caprolactam. An example of a diamine is 1,6-diaminohexane. Examples of dicarboxylic acids are adipic acid, terephthalic acid, isophthalic acid and 1,4-naphthalenedicarboxylic acid. Examples of polyamides are polyhexamethylene adipamide and polycaprolactam.

Polyesters are polymers formed from at least one monomer having an hydroxy as well as a carboxy group or from at least one monomer having two hydroxy groups and at least one monomer having two carboxy groups or a lactone group. An example of a monomer having a hydroxy as well as a carboxy group is adipic acid. An example of a diol is ethylene glycol. An example of a monomer having a lactone group is caprolactone. Examples of dicarboxylic acids are terephthalic acid, isophthalic acid and 1,4-naphthalenedicarboxylic acid. An example of a polyester is polyethylene terephthalate. So-called alkyd resins are also regarded to belong to polyester polymers.

Polyurethane are polymers formed from at least one diisocyanate monomer and at least one polyol monomer and/or polyamine monomer. Examples of diisocyanate monomers are hexamethylene diisocyanate, toluene diisocyanate and diphenylmethane diisocyanate.

Examples of sulfone-based polymers are polyarylsulfone, polyethersulfone, polyphenyl-sulfone and polysulfone. Polysulfone is a polymer formed from 4,4'-dichlorodiphenyl sulfone and bisphenol A.

Examples of natural polymers are starch, cellulose, gelatine, caesin and natural rubber. Examples of derivatives are oxidised starch, starch-vinyl acetate graft copolymers, hydroxyethyl cellulose, hydroxypropyl cellulose, methyl cellulose, ethyl cellulose, carboxymethyl cellulose and acetyl cellulose.

The polymeric binders are known in the art and can be produced by known methods, e.g. by polymerisation starting from suitable monomers.

Preferably, the polymeric binder is selected from the group consisting of acrylic polymers, styrene polymers, vinyl polymers and derivatives thereof, polyolefins, polyurethanes and natural polymers and derivatives thereof.

More preferably, the polymeric binder is selected from the group consisting of acrylic polymers, styrene butadiene copolymers, styrene-maleic anhydride copolymers, polyvinyl alcohol, polyvinyl acetate, partially hydrolysed polyvinyl acetate, methyl vinyl ether-maleic anhydride copolymers, carboxy-modified polyvinyl alcohol, acetoacetyl-modified polyvinyl alcohol, diacetone-modified polyvinyl alcohol and silicon-modified polyvinyl alcohol, isopropylene-maleic anhydride copolymer, polyurethane, cellulose, gelatine, caesin, oxidised starch, starch-vinyl acetate graft copolymers, hydroxyethyl cellulose, methyl cellulose, ethyl cellulose, carboxymethyl cellulose and acetyl cellulose.

More preferably, the polymeric binder is polyvinyl alcohol or an acrylic polymer as sold for example by Ciba under the tradename Ciba® Glascol® such as Ciba® Glascol® LE15, LS26, E11 or C44. Ciba® Glascol® LS 26 is a core shell polymer consisting of 70 weight parts 55/45 (w/w) styrene/2-ethylhexyl acrylate copolymer, which functions as the core polymer, and 30 weight parts of styrene/acrylic acid copolymer, which functions as the shell polymer.

Most preferably, the binder is selected from vinylacetate; (meth)acrylic and styrene type homo and copolymers, e.g. dimethylamino ethyl methacrylate or methyl methacrylate polymers; carboxymethylcellulose; and starch-type binders. Suitable binders based on vinylacetate, butadiene, acrylic and styrene homo and copolymers are sold by Ciba® under the trade name LATEXIA®.

Preferably, the composition of the present invention can also comprise additional components, in particular components which are suitable for improving the performance of the composition.

Components suitable for improving the performance of the composition can absorb the incident energy and transfer this energy to the system thermally or otherwise such as IR absorber or UV absorber. Examples of other types of additional components that improve the performance of the composition are pigments, stabilizers, antioxidants, rheology modifiers, wetting agents, biocides, smoke suppressants and taggants. Taggants are various substances added to a product to indicate its source of manufacture.

Examples of IR absorbers are alkylated triphenyl phosphorothionates, for example as sold under the trade name Ciba® Irgalube® 211. An example of a UV absorber is 2-hydroxy-4-methoxybenzophenone.

Pigments can be added for enhanced contrast between unimaged and imaged areas or as a security feature.

Examples of pigments which can be added for enhanced contrast between an unimaged and an imaged area are titanium dioxide, calcium carbonate, kaolin, calcined kaolin, aluminium hydroxide, talc, zinc oxide, amorphous silica, barium sulfate, polystyrene resin, urea-formaldehyde resin, hollow plastic pigment and mixtures thereof.

Examples of pigments which can be added as a security feature are fluorescent pigments or magnetic pigments.

Examples of rheology modifiers are xanthan gum, methylcellulose, hydroxypropyl methylcellulose, or acrylic polymers such as sold under the tradenames Ciba® Rheovis® 112, Ciba® Rheovis® 132 and Ciba® Rheovis® 152.

An example of a wetting agent is Ciba® Irgaclear® D, a sorbitol based clarifying agent, Examples of biocides are Acticide® MBS, which includes a mixture of chloromethyl isothiazolinone and methyl isothiazolinone, Biocheck® 410, which includes a combination of 2-dibromo-2,4-dicyanobutane and 1,2-benzisothiazolin-3-one, Biochek®721M, which includes a mixture of 1,2-dibromo-2,4-dicyanobutane and 2-bromo-2-nitro-1,3-propandiol and Metasol®TK 100, which includes 2-(4-thiazolyl)-benzimidazole.

An example of a smoke suppressant is ammonium octamolybdate.

The coatings formed by the coating compositions of the present invention can be coated with a laminate layer or overprint varnish. If the material of the laminate layer or the overprint varnish is selected so that it does not absorb at the wavelength of the imaging laser then the laser sensitive coating can be imaged through the laminate layer without damaging or marking the laminate. Also the laminate or overprint varnish is ideally chosen that it does not result in colouration of the coating before the energy treatment.

The coating composition of the present invention preferably comprises 1 to 50%, preferably 1 to 40%, more preferably 1 to 20%, most preferably 1 to 5% by weight of the first compound capable of forming a coloured substance upon exposition to energy, based on the weight of the total composition.

The coating composition of the present invention preferably comprises 1 to 40%, preferably 1 to 30%, more preferably 1 to 20%, most preferably 1 to 5% by weight of the latent activator selected from the group consisting of ammonium phosphate, ammonium polyphosphate, ammonium sulfite, ammonium thiosulfate, ammonium sulfamate and ammonium sulfate, based on the weight of the total composition.

The coating composition of the present invention preferably comprises 1 to 30%, preferably 1 to 20%, more preferably 1 to 15%, most preferably 1 to 5% by weight of the second compound capable of forming a coloured substance upon exposition to energy, based on the weight of the total composition.

The composition of the present invention preferably comprises 10 to 95%, preferably 20 to 95%, more preferably 50 to 95% and most preferably 70 to 90% by weight of the solvent, based on the weight of the total composition.

The composition of the present invention preferably comprises 1 to 80%, preferably 1 to 60%, more preferably 1 to 40% and most preferably 1 to 20% by weight of the polymeric binder, based on the weight of the total composition.

The composition of the present invention can comprise 0 to 30%, preferably 0 to 20%, more preferably 0 to 10% and most preferably 0 to 5% by weight of additional components, based on the weight of the total composition.

The composition of the present invention thus preferably consists of 1 to 50% of the first compound capable of forming a coloured substance upon exposition to energy, 1 to 40% by weight of the latent activator selected from the group consisting of ammonium phosphate, ammonium polyphosphate, ammonium sulfite, ammonium thiosulfate, ammonium sulfamate and ammonium sulfate, 1 to 30% of the second compound capable of forming a coloured substance upon exposition to energy, 10 to 95% of the solvent, 1 to 80% of the polymeric binder, and 0 to 30% of additional components, all based on the weight of the total composition.

More preferably, the composition of the present invention consists of 1 to 40% of the first compound capable of forming a coloured substance upon exposition to energy, 1 to 30% by weight of the latent activator selected from the group consisting of ammonium phosphate, ammonium polyphosphate, ammonium sulfite, ammonium thiosulfate, ammonium sulfamate and ammonium sulfate, 1 to 20% of the second compound capable of forming a coloured substance upon exposition to energy, 20 to 95% of the solvent, 1 to 60% of the polymeric binder, and 0 to 20% of additional components, all based on the weight of the total composition.

Even more preferably, the composition of the present invention consists of 1 to 20% of the first compound capable of forming a coloured substance upon exposition to energy, 1 to 20% by weight of the latent activator selected from the group consisting of ammonium phosphate, ammonium polyphosphate, ammonium sulfite, ammonium thiosulfate, ammonium sulfamate and ammonium sulfate, 1 to 30% of the second compound capable of forming a coloured substance upon exposition to energy, 10 to 95% of the solvent, 1 to 80% of the polymeric binder, and 0 to 30% of additional components, all based on the weight of the total composition.

Most preferably, the composition of the present invention consists of 1 to 50% of the first compound capable of forming a coloured substance upon exposition to energy, 1 to 40% by weight of the latent activator selected from the group consisting of ammonium phosphate, ammonium polyphosphate, ammonium sulfite, ammonium thiosulfate, ammonium sulfamate and ammonium sulfate, 1 to 15% of the second compound capable of forming a coloured substance upon exposition to energy, 50 to 95% of the solvent, 1 to 40% of the polymeric binder, and 0 to 30% of additional components, all based on the weight of the total composition.

In a very preferred embodiment of the present invention, the coating composition comprises
5-25% by weight sucrose,
0-10% by weight ammonium sulfate,
0-10% by weight diammonium hydrogenphosphate,
(provided that the sum of ammonium sulfate and diammonium hydrogenphosphate,
is greater than 0% by weight, preferably greater than 0.1% by weight),
0.2-5% by weight 3-dibutylamino-6-methyl-7-anilinofluoran (for example Pergascript® Black 2C) or 0.2-25% ammonium octamolybdate,
0-10% by weight developer (in particular N-(p-toluenesulfonyl)-N'-3-(p-toluenesulfonyloxyphenyl)urea (for example Ciba® Pergafast® 201), and
5-40% polymeric binder (in particular a core shell polymer wherein both the core and the shell comprise styrene acryl copolymers).

The invention is moreover directed to a process for preparing the composition of the first aspect of the present invention comprising a step of mixing a char forming compound as a first compound capable of forming a coloured substance upon exposition to energy; at least one latent activator selected from the group consisting of ammonium phosphate, ammonium polyphosphate, ammonium sulfite, ammonium thiosulfate, ammonium sulfamate and ammonium sulfate; and a second compound capable of forming a coloured substance exposition to energy, selected from the group consisting of colour formers, oxygen containing transition metal compounds, and metal-chelate-type colour forming systems.

Furthermore, the invention is directed to a process for preparing the composition of the second aspect of the present invention, comprising the step of mixing a char forming compound as a first compound capable of forming a coloured substance upon exposition to energy; and a second compound capable of forming a coloured substance upon exposition to energy, selected from the group consisting of colour formers and metal-chelate-type colour forming systems.

Preferably, these processes comprise mixing the aforementioned components and a solvent. More preferably, these processes each comprise mixing the aforementioned components, a solvent, a polymeric binder, and optionally additional components.

Also part of the invention is a substrate coated with the coating composition according to the first or the second aspect of the present invention.

The substrate can be a sheet or any other three dimensional object, it can be transparent or opaque and it can have an even or uneven surface. An example of a substrate having an uneven surface is a filled paper bag, such as a paper bag of cement. The substrate can be made from paper, cardboard, metal, wood, textiles, glass, ceramics and/or polymers. The substrate can also be a pharmaceutical tablet or foodstuff. Examples of polymers are polyethylene terephthalate, low density-polyethylene, polypropylene, biaxially orientated polypropylene, polyether sulfone, polyvinyl chloride polyester and polystyrene. Preferably, the substrate is made from paper, cardboard or polymer.

In a preferred embodiment, the thickness of the coating is in the range of 0.1 to 1000 µm. More preferably, it is in the range of 1 to 500 µm. Even more preferably, it is in the range of 1 to 200 µm. Most preferably, it is in the range of 1 to 120 µm.

In an alternative preferred embodiment, the coat weight is in the range of from 1 to 20 $g/m^2$, more preferably within the range of from 1 to 12 $g/m^2$, and even more preferably in the range of from 3 to 8 $g/m^2$.

Another aspect of the present invention is a process for preparing a coated substrate, which comprises the step of coating a substrate with the composition of the present invention.

The substrate can be coated with the composition of the present invention by using a standard coating application such as a bar coater application, rotation application, spray application, curtain application, dip application, air application, knife application, blade application or roll application. The composition can also be applied to the substrate by various printing methods such as silk screen printing, gravure printing, offset printing and flexo printing. If the substrate is paper, the composition can also be applied in the size press or at the wet-end of the paper machine.

The coating composition can be dried, for example at ambient or elevated temperature. An elevated temperature is ideally chosen to avoid image formation before exposure to the energy.

Also part of the invention is a process for preparing a marked substrate, which comprises the steps of i) coating a substrate with the composition of the present invention, and ii) exposing those parts of the coated substrate, where a marking is intended, to energy in order to generate a marking.

The energy can be heat or any other energy, which yields a marking when applied to the substrate coated with the composition of the present invention. Examples of such energy are UV, IR, visible or microwave irradiation.

The energy can be applied to the coated substrate in any suitable way, for example heat can be applied by using a thermal printer, and UV, visible and IR irradiation can be applied by using a UV, visible or IR laser. Examples of IR lasers are $CO_2$ lasers, Nd:YAG (neodym-yttrium-aluminum garnet) lasers and IR semiconductor lasers.

Preferably, the energy is IR irradiation. More preferably, the energy is IR irradiation having a wavelength in the range of 780 to 1'000'000 nm. Even more preferably, the energy is IR irradiation generated by a CO₂ laser or a Nd:YAG laser. Most preferably, the energy is IR irradiation generated by a CO₂ laser having a wavelength of 10'600 nm.

Typically the exact power of the IR laser and the line speed is determined by the application and chosen to be sufficient to generate the image, for example, when the wavelength of the IR laser is 10'600 nm and the diameter of the laser beam is 0.35 mm, the power is typically 0.5 to 4 W, and the line speed is typically 300 to 1'000 mm/s.

Yet another aspect of the invention is the marked substrate, which is obtained by the above process.

The coating composition of the present invention has the advantage that transparent, high contrast coloured images of any desired colour can be produced with ease. Weaknesses of coating compositions for marking that contain only a single colour forming system regarding image stability, background stability, formulation stability and color deficiencies can be compensated. In embodiments, a synergistic effect is produced particularly regarding light fastness of the image even in absence of the UV absorbers. In this regard, the coating composition of the present invention allows a tuning of the system by adjusting the amounts and types of all the components used in the compositions of the invention (e.g. binder, auxiliaries etc.) to achieve maximum performance.

The coating composition of the present invention can have higher sensitivity than coating compositions that do not contain the second compound capable of forming a coloured substance upon exposition to energy. I.e., the coating composition of the present invention produces darker marks. On the other hand, the amount of the second compound can be minimized such that the background discoloration of the latter (for example ammonium octamolybdate) is improved. The amount of the second compound can be often kept below 1%.

Surprisingly, the char forming compound (first compound capable of forming a coloured substance upon exposition to energy; for example sucrose) has a modulating effect on the performance of the coating composition, in particular on the performance of the second compound. Namely, it often slows down the colour change of the second compound and makes the latter thus more compatible with the char forming compound whose colour change is usually slower.

Moreover, the char forming compound, in particular sucrose, may have a beneficial effect on the transparency of the coatings. For example, ammonium octamolybdate has the tendency to deteriorate the transparency of the coatings. The image and background stability are often improved.

Finally, the char forming compound, in particular sucrose, can surprisingly act as a developer for the second compound (in particular when color formers are used as the second compound).

EXAMPLES

Preparation of Coating Compositions

The compositions of the laser active coatings of Examples 1 to 26 according to the invention are shown in Table 1. The compositions of the coatings of Comparative Examples 1 to 3 are listed in Table 2. The compositions of the laser active coating of Example 27 according to the invention, Example 28 not according to the invention, and of Comparative Example 4 are shown in Table 3. All compositions show Newtonian flow behaviour except for Examples 3 and 6, which are slightly pseudo-plastic. The color of the compositions is slightly off-white for most of the examples. Exceptions are Example 12 and Comparative Example 3 (trace grey), Examples 11 and 24 (slightly grey), Examples 27 and 28, and Comparative Example 4 (white).

Preparation of an Acrylic Binder (Binder A1)

To a 1 liter resin pot fitted with mechanical stirrer, condenser, nitrogen inlet, temperature probe and feed inlets are placed 98.9 g water and 483.9 g Joncryl® 8078 which is sold by BASF SE, a solution of an ammonium salt of a low molecular weight styrene acrylic copolymer. The contents are heated to 85° C. and degassed with nitrogen for 30 minutes. A monomer phase is prepared by mixing 192.5 g styrene with 157.5 g 2-ethylhexyl acrylate. An initiator feed is prepared by dissolving 1.97 g ammonium persulfate in 63.7 g water. When the reactor is at temperature and degassed, 0.66 g ammonium persulfate are added to the reactor. After 2 minutes, the monomer and initiator feeds are started appropriate to a 3 and 4 hour feed respectively. The reactor contents are maintained at 85° C. throughout the feeds. After completion of the feeds, the reactor contents are held for a further 1 hour at 85° C. before being cooled down to below 40° C. at which point 0.9 g Acticide LG, a biocide containing chlorinated and non-chlorinated methyl isothiazolones, is added. This results in an emulsion polymer of 49.2% solids, pH 8.3 and a Brookfield RVT viscosity of 1100 cPs.

Preparation of Coating Composition A (Char Forming Compound)

6 g diammonium hydrogen phosphate, 6 g ammonium sulfate and 15 g sucrose are dissolved in 33 g water. The resulting solution is then added dropwise over 15 minutes to 40 g of the acrylic binder prepared in Example 1. Whilst adding the solution dropwise, the pH is maintained above 7.5 by dropwise addition of aqueous ammonia. The mixture is stirred for 10 minutes to produce a laser active coating emulsion. The composition is depicted in Table 2, Comparative Example C1.

Preparation of Aqueous Dispersion B (25% by Weight Color Former)

6 g 3-dibutylamino-6-methyl-7-anilinofluoran (Color former B2, for example Ciba® Pergascript Black® 2C), 12 g 10% solution of Poval 203 (partially hydrolysed PVA manufactured by Kuraray Co. Ltd.), 5.8 g of water and 0.18 g of 20% Surfynol® 104 (wetting agent manufactured by Air Products & Chemicals Inc.) are mixed and milled to a mean particle size of about 1 micron.

Preparation of Aqueous Dispersion C (25% by Weight Color Developer)

6 g N-(p-toluenesulfonyl)-N'-3-(p-toluenesulfonyloxyphenyl)urea (developer D1; for example Ciba® Pergafast® 201), 4 g 10% solution of PVA (Poval 203), 5.8 g water and 0.40 g Huntsman® Dehscofix®930 dispersant are mixed and milled to a mean particle size of about 1 micron.

Preparation of Coating Composition D (Color Former System)

2.85 g Dispersion B, 4.5 g Dispersion C, 8.85 g Binder A1, and 18.9 g water are mixed and stirred for 10 minutes to produce a white dispersion of composition (% weight) 2% color former, 3.2% developer and 25.2% binder.

Preparation of Composition E 34.0 g sucrose, 13.6 g diammonium hydrogen phosphate, 13.6 g ammonium sulfate are dissolved in 38.8 g water by gentle heating.

Example 1

Preparation of Coating Composition (75% Composition A+25% Composition D)

26.25 g Coating Composition A and 8.75 g coating composition D are mixed and stirred for 10 minutes to produce a laser active coating dispersion.

Example 2

17.5 g Coating Composition A and 17.5 g Coating Composition D are mixed and stirred for 10 minutes to produce a laser active coating dispersion.

Example 3

A more concentrated dispersion than described in Example 1, comprising the laser active components in a similar ratio but a reduced amount of binder can be prepared starting from Composition E.

10 g Binder A1 are diluted under stirring with 10 g water. 22.05 g Composition E and 4.24 g water are premixed and the mixture is added within 5 min under stirring. 1.43 g color former Dispersion B is added followed by 2.28 g developer Dispersion C five min later whilst stirring is continued for an additional 10 min to produce a laser active coating dispersion.

Example 4

Example 3 was repeated except that a variant of Dispersion C is used where Poval 203 has been replaced by equal amounts of water and a laser active coating dispersing is produced.

Example 5

Example 3 was repeated except that a variant of dispersion C is used where Poval 203 has been replaced by equal amounts of water and Dehscofix®930 has been replaced by equal amounts of Ciba® Glascol™ LS16 dispersant. A laser active coating dispersion is produced.

Example 6

Example 3 was repeated except that the color former component is replaced by equal amounts of 3-diethylamino-6-methyl-7-anilinofluoran (Color former B1; for example Ciba® Pergascript® Black 1C). A laser active coating dispersion is obtained.

Examples 7 and 22

Less Sugar, Respectively No Latent Activator

In the same way as described above, the laser active coating dispersions of Example 7 (less sugar) and of Example 22 (no latent activator) can be produced having the composition compiled in Table 1.

Examples 8 to 10

With the Styrene Butadiene Lattice Ciba®Latexia® 319, Binder A4

In the same way as described above, laser active coating dispersions 8 to 10 can be produced having the composition compiled in Table 1.

Examples 11 and 12

If in Example 1 and 2, the developer is replaced by 4,4'-Bisphenol sulfone purchased from ABCR GmbH & Co. KG, Karlsruhe, laser active coating formulations with the composition listed in Table 1 can be produced.

In Examples 13 to 21, the developer has been omitted from the coating composition. These samples can be milled with all components included.

Example 13

26.25 g of Composition A and 0.36 g Ciba® Pergascript® Black 2C are mixed and milled to a mean particle size of about 1 micron to produce a laser active coating dispersion.

Example 14

22.05 g of Composition E are premixed with 6.7 g water and the mix is added within 5 min under stirring to 20 g Binder A1. 1.25 g Ciba® Pergascript® Black 2C are added whilst stirring is continued for an additional 10 min to produce a laser active coating dispersion.

Examples 15 to 17

If in Example 14, color former B2 (for example Ciba® Pergascript® Black 2C) is replaced by the same amount of 3-diethylamino-6-methyl-7-anilinofluoran (color former B1; for example Ciba® Pergascript® Black 1C), resp. 3-(ethyl-2-methylbutyl)amino-6-methyl-7-anilinofluoran) (color former B3, for example S-205 manufactured by Yamada Chemical Co. Ltd.), resp. 3-ethyl(toluyl)amino-6-methyl-7-anilinofluoran (color former B4; for example Black ETAC manufactured by Yamada Chemical Co. Ltd)., laser active coating dispersions can be produced.

Examples 18 to 21

If in Example 14, the acrylic binder is replaced by the same amount of Ciba® Latexia 318, resp. Ciba® Latexia® 319, resp. Ciba® Latexia® 302-S, resp. Ciba® Latexia® 707, laser active dispersions can be produced. Latexia® are styrene butadiene lattices. Ciba® Latexia® 319 (Binder A4) is a styrene butadiene lattice with solids content 50%, particle size 0.12 μm, glass transition temperature Tg 28° C. Ciba® Latexia® 318 (Binder A3) is a styrene butadiene lattice with solids content 50%, particle size 0.12 μm, glass transition temperature Tg 22° C. Ciba® Latexia® 302 (Binder A2) is a styrene butadiene lattice with solids content 50%, particle size 0.15 μm, and glass transition temperature Tg 10° C.).

Example 23

Composition of Example 14, however with no ammonium containing latent activator and no developer.

Examples 24 to 26

Eco Friendly Zinc Based Developers, No Latent Ammonium Activator

If in example 22, the Ciba® Pergafast® 201 developer dispersion is replaced by an aqueous 25% $ZnCl_2$ solution, resp. by an aqueous 30% dispersion of Zinc stearate, the laser active coating compositions listed in Table 1 for Examples 24 to 26 can be produced.

TABLE 1

| No. | Sucrose[1] % weight | $(NH_4)_2SO_4$/ $(NH_4)_2HPO_4$ % weight | Color former[2] content of active ingredient in % weight | Developer[3] content of active ingredient in % weight | Binder % weight as is |
|---|---|---|---|---|---|
| 1 | 11.25 | 4.5/4.5 | 0.50 B2 | 0.80 D1 | 30 Binder A1 |
| 2 | 7.5 | 3/3 | 1.00 B2 | 1.60 D1 | 20 Binder A1 |
| 3 | 15 | 6/6 | 0.72 B2 | 1.14 D1 | 20 Binder A1 |
| 4 | 15 | 6/6 | 0.72 B2 | 1.14 D1[4] | 20 Binder A1 |
| 5 | 15 | 6/6 | 0.72 B2 | 1.14 D1[5] | 20 Binder A1 |
| 6 | 15 | 6/6 | 0.72 B1 | 1.14 D1 | 20 Binder A1 |
| 7 | 7.5 | 6/6 | 0.72 B2 | 1.14 D1 | 20 Binder A1 |
| 8 | 15 | 6/6 | 0.72 B2 | 1.14 D1 | 20 Binder A4 |
| 9 | 15 | 6/6 | 0.72 B2 | 1.14 D1[4] | 20 Binder A4 |
| 10 | 15 | 6/6 | 0.72 B2 | 1.14 D1[5] | 20 Binder A4 |
| 11 | 11.25 | 4.5/4.5 | 0.50 B2 | 0.80 4.4'-bisphenol sulfone | 30 Binder A1 |
| 12 | 7.5 | 3/3 | 1.00 B2 | 1.60 4.4'-bisphenol sulfone | 20 Binder A1 |
| 13 | 14.8 | 5.9/5.9 | 1.34 B2 | — | 39.5 Binder A1 |
| 14 | 15 | 6/6 | 2.5 B2 | — | 40 Binder A1 |
| 15 | 15 | 6/6 | 2.5 B1 | — | 40 Binder A1 |
| 16 | 15 | 6/6 | 2.5 B3 | — | 40 Binder A1 |
| 17 | 15 | 6/6 | 2.5 B4[6] | — | 40 Binder A1 |
| 18 | 15 | 6/6 | 2.5 B1 | — | 40 Binder A3 |
| 19 | 15 | 6/6 | 2.5 B1 | — | 40 Binde A4 |
| 20 | 15 | 6/6 | 2.5 B1 | — | 40 Latexia ® 302-S |
| 21 | 15 | 6/6 | 2.5 B1 | — | 40 Latexia ® 707 |
| 22 | 15 | 0/0 | 0.72 B2 | 1.14 D1 | 20 Binder A1 |
| 23 | 15 | 0/0 | 0.72 B2 | — | 40 Binder A1 |
| 24 | 15 | 0/0 | 0.72 B2 | 1.14 zinc chloride | 20 Binder A1 |
| 25 | 15 | 0/0 | 2.0 B2 | 4.0 zinc chloride | 25 Binder A1 |
| 26 | 15 | 0/0 | 2.0 B2 | 4.0 zinc stearate | 25 Binder A1 |

[1]ratio of sucrose:color former = (6-22.5):1
[2]formulated with Poval 203 resp. Surfynoll ® 104, ratio color former:developer = 1:1.6
[3]formulated with Poval 203 resp. Dehscofix ® 930
[4]Poval 203 replaced by equal amount of water
[5]Poval 203 replaced by equal amount of water and Dehscofix ® 930 replaced by Ciba ® Glascol ™ LS16 acrylic dispersant
[6]Color former manufactured by Yamada Chemical Co. Ltd.

Comparative Examples

In the Comparative Examples, coating compositions comprising either of the first and the second compound capable of forming a coloured substance upon exposition to energy, in the same amounts as in the Examples described, above were produced. Their compositions are listed in Table 2.

Comparative Example C1

Comparative Example C1 was carried out by using Composition A alone (char forming compound). This composition was also used to produce images of optical density close to 1 for image resp. background stability testing.

Comparative Example C2

Color Former System as Comprised in Example 3

Comparative Example C2 (colour former system alone) was produced with the methodology outlined in Example 1.

Comparative Example C3

Color Former System as Comprised in Examples 11 and 12

Comparative Example C3 was produced with the methodology outlined in Example 1.

TABLE 2

| No. | sucrose | $(NH_4)_2SO_4$/ $(NH_4)_2HPO_4$ | color former (in % weight) | developer (in % weight) | Binder (in % weight) |
|---|---|---|---|---|---|
| C1 | 15 | 6/6 | — | — | 40 Binder A1 |
| C2 | — | — | 0.72 B2 | 1.14 D1 | 25 Binder A1 |
| C3 | — | — | 2.00 B2 | 3.2 4.4'-bisphenol sulfone | 25 Binder A1 |

Examples 27 and 28

With Ammonium Octamolybdate (AOM)

Colorless laser active coating compositions as described in Table 3 are produced by mixing corresponding amounts of Composition E, a 10% aqueous solution of ammonium octamolybdate (purchased from H. C. Starck GmbH), the pH of which has been adjusted to 8 with ammonia solution, Binder A1 and water.

Comparative Example C4

A composition comprising 5% ammonium octamolybdate (AOM) and 20% Binder A1 and no sugar resp. ammonium sulfate/phosphate is produced with the methodology described above.

TABLE 3

| No. | Sucrose[1] (% weight) | $(NH_4)_2SO_4$/ $(NH_4)_2HPO_4$ (% weight) | Ammonium octamolybdate (% weight) | Binder (% weight) |
|---|---|---|---|---|
| 27 | 15 | 6/6 | 5.0 | 20 Binder A1 |
| 28* | 15 | 0/0 | 5.0 | 20 Binder A1 |
| C4 | — | 0/0 | 5.0 | 20 Binder A1 |

Formulation Stability

The coating compositions of all Examples and Comparative Examples show slight settling. This can be easily corrected for by adding thickening agents, e.g. xanthan gum. The coating compositions based on 3-dibutylamino-6-methyl-7-anilinofluoran (for example Ciba® Pergascript® Black 2C) do not show discoloration after storage for 1 month at 40° C. and the marking performance of the coated substrates is comparable to the one before storage.

Application of the Coating Compositions on Paper and Polymer Film as Substrates

Evaluation of Coated Substrates

The coated substrates prepared according to the invention are evaluated as described below. The results of the evaluations are summarized in Tables 4 to 7.

The coating compositions of the above Examples and Comparative examples are applied by coating bars of adequate dimensions adjusted to the viscosity of the samples onto Xerox paper (coated "Cento Copy" paper purchased from M-Real, Biberist, Switzerland) respectively polyester film as substrates. After drying, transparent coatings are obtained with coat weights in the range of 3-10 g/m². The coatings are then imaged using a $CO_2$ IR laser (wavelength: 10'600 nm, power: 0.5-4 W, diameter of laser beam: 0.35 mm, line speed 300-1000 mm/s) to yield black high contrast markings in the cases where the char forming compound (sugar charring system) has been used together with the second compound capable of forming a coloured substance upon exposition to energy. Brown to black markings are obtained, when only the sugar charring system is applied.

Marking results demonstrating the boosting effect, if the sugar charring system is mixed with the aforementioned second compound are depicted in Table 4. Systems wherein either the first or the second compound capable of forming a coloured substance is used (sugar charring and color former based systems) in comparable strength as used in the Examples wherein the first and the second compound were used in admixture, are depicted in Table 5.

Marking results with the coating compositions of the present invention are in general more black (columns 2-5) when compared to the system where the coating composition contains only the char forming compound (to be referred to also as "sugar charring system") (see Comparative Example 1), also in the cases where no developer is present. Under the marking conditions described in column 3, the sugar charring system produces blackish brown marks, whilst the color former system of Comparative Example 2 is totally burnt off. However the mixed system, e.g. Examples 3-6 under the same conditions produces brownish black marks of slightly higher strength (not depictable by the rough scaling of the values). The interpretation is that sugar charring slows down the reactivity of the color former system such as to cause both systems to react simultaneously. This is demonstrated more quantitatively using the optical density values depicted in Table 7 (cf. column 2 and the respective discussion).

The systems of Examples 27 and 28 wherein AOM is used as the second compound in combination with a sugar charring system are more sensitive than the system of Comparative Example C4 without the sugar charring system.

Applications on polyester films show similarly good marking results.

TABLE 4

Marking results on Xerox paper

| Example(s) No(s). | Filled circles 1 W/1000 mmsec | Filled circles 2 W/1000 mmsec | Small letters 1 W/1000 mmsec | Small letters 2 W/1000 mmsec |
|---|---|---|---|---|
| 1 | 3 brbl | 1 brbl | 3-4 bl | 2-3 brbl |
| 2 | — | — | 3 bl | 2 bl |
| 3-6 | 3 brbl | 1 brbl | 2-3 bl | 2 brbl |
| 7 | 3 br | 2 br | 5 bl | 4 brbl |
| 8-10 | 3 br | 2 brbl | 4 bl | 2-3 brbl |
| 11 | 2 bl | 1 bl | 4 bl | 1-2 brbl |
| 12 | 2-3 brbl | 1 bl | 4 bl | 2 brbl |
| 13 | 3 br | 1 bl | 6 | 3 brbl |
| 14-20 | 3 brbl | — | 6 | 3 brbl |
| 21 | 3 brbl | 1 brbl | 6 | 4 brbl |
| 22 | 3 bl | burnt off | 3 bl | 2 bl |
| 23 | 4 br | 4 brbl | 5 bl | 4-5 bl |
| 24 | 2 bl | 2 brbl | 3 bl | 2-3 bl |
| 25 | 1 bl | 1 bl | 2 bl | 1-2 bl |
| 26 | 2 bl | 2 brbl | 3 bl | 2 bl |
| 27 | 3 brbl | 1 brbl | 6 | 3 brbl |
| 28* | 3 br | 2 br | 6 | 3-4 brbl |

Scaling:

| colors | black = | bl |
| | brownish black = | brbl |
| | brown = | br |
| strength | strong = | 1 |
| | medium = | 2 |
| | weak = | 3 |
| | very weak = | 4 |
| | trace = | 5 |
| | zero = | 6 |

TABLE 5

Marking results for Comparative Examples

| Comparative Example No. | Filled circles 1 W/1000 mmsec | Filled circles 2 W/1000 mmsec | Small letters 1 W/1000 mmsec | Small letters 2 W/1000 mmsec |
|---|---|---|---|---|
| C1 (15% sugar) | 3 br | 1 brbl | 6 | 3 br |
| C2 (0.72% colour former) | 3 bl | burnt off | 3 bl | 2-3 bl |
| C3 (2.0% colour former) | 1 bl | burnt off | 2 blk | 1 bl |
| C4 (5% AOM) | 5 br | 2-3 br | 6 | 6 |

Marking Results on Polyester Film

Examples 3 to 6, 8 to 10 and 13 were also coated on polyester film. After drying semi transparent coatings are obtained with coat weights in the range of 3-10 g/m². The coatings after imaging with a $CO_2$ IR laser (wavelength: 10'600 nm, power: 0.5-4 W, diameter of laser beam: 0.35 mm, line speed 300-1000 mm/s) yield black high contrast markings which are darker compared to corresponding coatings with Comparative Example C1.

Evaluation of Image and Background Stability

Image and background stability results for selected coated Xerox papers are listed in Tables 6 and 7.

Image Optical Density

The images are produced with the laser marking device described above using the settings 1 W for the energy and 1000 mm/sec for the line speed. The optical density (o.d.) of the image is measured with a Spectroeye densitometer from Gretag-Macbeth.

Background Stability

The optical density (OD) of the unrecorded portion of the coated substrate is measured with a Spectroeye densitometer from Gretag-Macbeth.

Heat Resistance

After printing, the coated substrate is stored for 24 hours in an oven maintained at 60° C. The optical densities of the recorded and unrecorded portions are then measured with a Spectroeye densitometer from Gretag-Macbeth.

Heat/Humidity Resistance

After printing, the coated substrate is stored for 24 hours in an oven maintained at 40° C. and 90% relative humidity. The optical densities of the recorded and unrecorded portions are then measured with a Spectroeye densitometer from Gretag-Macbeth.

Light Resistance

After printing, the coated substrate is stored for 18 hours in a xenon weatherometer (Atlas Suntester CPS+, 250 W/m$^2$). The optical densities of the recorded and unrecorded portions are then measured with a Spectroeye densitometer from Gretag-Macbeth.

Oil Resistance

After printing, the coated substrate is gravure printed with cottonseed oil and then stored for 24 hours in an oven maintained at 40° C. The optical density of the recorded portion is then measured with a Spectroeye densitometer from Gretag-Macbeth.

From Tables 6 and 7, the following conclusions can be drawn:

The background stability of Example 11 (75% Composition A (char forming compound)+25% composition D (color former)) is as extrapolated from the corresponding stability increments of the compositions of Comparative Examples C1 and C3 (no additional synergy) and is adequate for practical applications. Image stability of the mixture is excellent particularly regarding light fastness. The optical density is high, demonstrating that the color former system is not burnt off at the higher energy level of 2 W/1000 mmsec. If this were the case, one would expect to find an initial color density of only 0.91 (1.21×0.75 from sugar charring only). Actual initial density however being 1.08 demonstrates a modulating effect of the sugar system on the overall performance.

TABLE 6

| | Background stability | | | | | |
|---|---|---|---|---|---|---|
| (Comparative) Example No. | CIE white optical density before exposure CIE white (o.d.) | Heat resistance1 1 h@80° C. CIE white (o.d.) | Heat/humidity Resistance 24 h@40° C./90% RH CIE white (o.d.) | Heat resistance2 24 h@60° C. CIE white (o.d.) | Xenon light 18 h@ 250 W/m$^2$ CIE white (o.d.) | Oil resistance 24 h 40° C. cotton seed oil CIE white (o.d.) |
| Comparative Example C1 | 120.97 (0.02) | 118.58 (0.03) | 121.81 (0.02) | 114.02 (0.04) | 110.35 (0.01) | 113.92 (0.04) |
| Comparative Example C2 | 114.82 (0.01) | 109.78 (0.02) | 111.55 (0.01) | 105.48 (0.02) | 43.72 (0.17) | 106.42 (0.03) |
| Example 4 | 115.37 (0.03) | 76.28 (0.19) | 93.77 (0.11) | 76.12 (0.16) | 62.00 (0.12) | 101.61 (0.07) |
| Comparative Example C3 | 104.14 (0.06) | 93.45 (0.09) | 98.88 (0.07) | 94.33 (0.07) | 34.74 (0.21) | 91.98 (0.08) |
| Example 11 | 117.16 (0.03) | 98.46 (0.09) | 112.04 (0.05) | 96.53 (0.08) | 87.81 (0.05) | 104.51 (0.06) |
| Example 12 | 104.75 (0.07) | 69.95 (0.22) | 83.98 (0.15) | 74.06 (0.18) | 61.98 (0.13) | 88.05 (0.06) |

TABLE 7

| | Image stability | | | | | | | | | |
|---|---|---|---|---|---|---|---|---|---|---|
| | 1 h@80° C. | | 24 h@40° C./90% RH | | 24 h@60° C. | | cottonseed oil resistance 24 h@40° C. | | xenon light 18 h@250 W/m$^2$ | |
| (Comp.) Example No. | Initial density | After exposure | Initial density | After exposure | Initial density | After exposure | Initial density | After exposure | Initial density | After exposure |
| C1 | 1.12 | 1.12 | 1.12 | 1.08 | 1.12 | 1.11 | 1.13 | 1.15 | 1.12 | 1.04 |
| C2 | 1.04 | 0.99 | 1.03 | 1.04 | 1.02 | 1.01 | 1.00 | 0.99 | 1.04 | 0.94 |
| 4 | 1.04 | 1.04 | 1.09 | 1.06 | 1.06 | 1.06 | 1.08 | 1.11 | 1.09 | 1.25 |
| C3 | 1.21 | 1.22 | 1.17 | 1.19 | 1.18 | 1.18 | 1.22 | 1.26 | 1.19 | 1.08 |
| 11 | 1.08 | 1.08 | 1.10 | 1.05 | 1.04 | 1.04 | 1.08 | 1.12 | 1.07 | 1.19 |
| 12 | 1.21 | 1.23 | 1.2 | 1.14 | 1.21 | 1.20 | 1.19 | 1.25 | 1.14 | 1.08 |

The invention claimed is:

1. A coating composition comprising:
   a char forming compound as a first compound capable of forming a colored substance upon exposition to energy;
   at least one latent activator selected from the group consisting of ammonium phosphate, ammonium polyphosphate, ammonium sulfite, ammonium thiosulfate, ammonium sulfamate, and ammonium sulfate;
   a second compound capable of forming a colored substance upon exposition to energy selected from the group consisting of color formers, oxygen containing transition metal compounds, and metal-chelate color forming systems; and
   at least one color developer.

2. The composition of claim 1, wherein the char forming compound is selected from the group consisting of carbohydrates and derivatives thereof, and wherein the carboxyl group has been reduced to a hydroxyl group.

3. The composition of claim 1, wherein the at least one latent activator is selected from the group consisting of ammonium phosphate and ammonium sulfate.

4. The composition of claim 1, wherein the color former is selected from the group consisting of phthalides, fluorans, triarylmethanes, benzoxazines, quinazolines, spiropyrans, quinones, thiazines, oxazines, and mixtures thereof.

5. The composition of claim 4, wherein the color former consists of at least one fluoran.

6. The composition of claim 1, wherein the composition further comprises a solvent.

7. The composition of claim 1, wherein the composition further comprises a polymeric binder.

8. The composition of claim 1, wherein the at least one color developer is selected from the group consisting of 2,2-bis(4-hydroxyphenyl)propane (bis phenol A), 2,2-bis(4'-hydroxyphenyl)-4-methylpentane, benzyl-4-hydroxybenzoate, 4,4'-dihydroxydiphenylsulfone, 2,4'-dihydroxydiphenylsulfone, 4-hydroxy-4'-isopropoxydiphenylsulfone, 2,2'-diallyl-4,4'-sulfonyldiphenol, phenol, 4,4'-sulfonylbis-polymer with 1,1'-oxobis(2-chloroethane), N-(p-toluenesulfonyl)-N'-3-(p-toluenesulfonyloxyphenyl)urea, 4-[(4-(1-methylethoxy)phenyl)sulfonyl]-phenol and carbamic acid, N,N'-[sulfonylbis[4,1-phenyleneiminocarbonylimino(methylphenylene)]]bis-,C,C'-diphenyl ester, 4,4'-bis(p-toluenesulphonylaminocarbonylamino)diphenylmethane), zinc bis[(4-n-octyloxycarbonylamino)salicylate]dihydrate, and 4-hydroxybenzoate derivative of a polypentaerythritol compound with CAS number 378244-93-0.

9. A process for preparing the composition of claim 1, comprising mixing
   a char forming compound as a first compound capable of forming a colored substance upon exposition to energy;
   at least one latent activator selected from the group consisting of ammonium phosphate, ammonium polyphosphate, ammonium sulfite, ammonium thiosulfate, ammonium sulfamate, and ammonium sulfate;
   a second compound capable of forming a colored substance upon exposition to energy selected from the group consisting of color formers, oxygen containing transition metal compounds, and metal-chelate color forming systems; and
   at least one color developer.

10. The process of claim 9, wherein the at least one color developer is selected from the group consisting of 2,2-bis(4-hydroxyphenyl)propane (bis phenol A), 2,2-bis(4'-hydroxyphenyl)-4-methylpentane, benzyl-4-hydroxybenzoate, 4,4'-dihydroxydiphenylsulfone, 2,4'-dihydroxydiphenylsulfone, 4-hydroxy-4'-isopropoxydiphenylsulfone, 2,2'-diallyl-4,4'-sulfonyldiphenol, phenol, 4,4'-sulfonylbis-polymer with 1,1'-oxobis(2-chloroethane), N-(p-toluenesulfonyl)-N'-3-(p-toluenesulfonyloxyphenyl)urea, 4-[(4-(1-methylethoxy)phenyl)sulfonyl]-phenol and carbamic acid, N,N'-[sulfonylbis[4,1-phenyleneiminocarbonylimino(methylphenylene)]]bis-,C,C'-diphenyl ester, 4,4'-bis(p-toluenesulphonylaminocarbonylamino)diphenylmethane), zinc bis[(4-n-octyloxycarbonylamino)salicylate]dihydrate, and 4-hydroxybenzoate derivative of a polypentaerythritol compound with CAS number 378244-93-0.

11. A substrate coated with the composition of claim 1.

12. A process for preparing a coated substrate, which comprises the step of coating a substrate with the composition of claim 1.

13. A process for preparing a marked substrate, which comprises the steps of
   i) coating a substrate with the composition of claim 1, and
   ii) exposing those parts of the coated substrate, where a marking is intended, to energy in order to generate a marking.

14. The process of claim 13, wherein the energy is selected from the group consisting of UV, IR, visible, and microwave irradiation.

15. A marked substrate, which is obtained by the process of claim 13.

16. A coating composition comprising:
   a char forming compound as a first compound capable of forming a colored substance upon exposition to energy;
   a second compound capable of forming a colored substance upon exposition to energy selected from the group consisting of phthalides, fluorans, triarylmethanes, benzoxazines, quinazolines, spiropyrans, quinones, thiazines, oxazines, and mixtures thereof;
   at least one latent activator selected from the group consisting of ammonium phosphate, ammonium polyphosphate, ammonium sulfite, ammonium thiosulfate, ammonium sulfamate, and ammonium sulfate; and
   at least one color developer.

17. The composition of claim 16, wherein the at least one latent activator is selected from the group consisting of ammonium phosphate and ammonium sulfate.

18. The composition of claim 16, wherein the at least one color developer is selected from the group consisting of 2,2-bis(4-hydroxyphenyl)propane (bis phenol A), 2,2-bis(4'-hydroxyphenyl)-4-methylpentane, benzyl-4-hydroxybenzoate, 4,4'-dihydroxydiphenylsulfone, 2,4'-dihydroxydiphenylsulfone, 4-hydroxy-4'-isopropoxydiphenylsulfone, 2,2'-diallyl-4,4'-sulfonyldiphenol, phenol, 4,4'-sulfonylbis-polymer with 1,1'-oxobis(2-chloroethane), N-(p-toluenesulfonyl)-N'-3-(p-toluenesulfonyloxyphenyl)urea, 4-[(4-(1-methylethoxy)phenyl)sulfonyl]-phenol and carbamic acid, N,N'-[sulfonylbis[4,1-phenyleneiminocarbonylimino(methylphenylene)]]bis-,C,C'-diphenyl ester, 4,4'-bis(p-toluenesulphonylaminocarbonylamino)diphenylmethane), zinc bis[(4-n-octyloxycarbonylamino)salicylate]dihydrate, and 4-hydroxybenzoate derivative of a polypentaerythritol compound with CAS number 378244-93-0.

19. A process for preparing the composition of claim 16, comprising mixing
   a char forming compound as a first compound capable of forming a colored substance upon exposition to energy;
   a second compound capable of forming a colored substance upon exposition to energy, selected from the group consisting of phthalides, fluorans, triarylmethanes, benzoxazines, quinazolines, spiropyrans, quinones, thiazines, oxazines, and mixtures thereof;

at least one latent activator selected from the group consisting of ammonium phosphate, ammonium polyphosphate, ammonium sulfite, ammonium thiosulfate, ammonium sulfamate, and ammonium sulfate; and at least one color developer.

20. The process of claim 19, wherein the at least one color developer is selected from the group consisting of 2,2-bis(4-hydroxyphenyl)propane (bis phenol A), 2,2-bis(4'-hydroxyphenyl)-4-methylpentane, benzyl-4-hydroxybenzoate, 4,4'-dihydroxydiphenylsulfone, 2,4'-dihydroxydiphenylsulfone, 4-hydroxy-4'-isopropoxydiphenylsulfone, 2,2'-diallyl-4,4'-sulfonyldiphenol, phenol, 4,4'-sulfonylbis-polymer with 1,1'-oxobis(2-chloroethane), N-(p-toluenesulfonyl)-N'-3-(p-toluenesulfonyloxyphenyl)urea, 4-[(4-(1-methylethoxy)phenyl)sulfonyl]-phenol and carbamic acid, N,N'-[sulfonylbis[4,1-phenyleneiminocarbonylimino(methylphenylene)]]bis-,C,C'-diphenyl ester, 4,4'-bis(p-toluenesulphonylaminocarbonylamino)diphenylmethane), zinc bis[(4-n-octyloxycarbonylamino)salicylate]dihydrate, and 4-hydroxybenzoate derivative of a polypentaerythritol compound with CAS number 378244-93-0.

21. A substrate coated with the coating composition of claim 16.

22. A process for preparing a coated substrate, which comprises the step of coating a substrate with the composition of claim 16.

23. A process for preparing a marked substrate, which comprises the steps of
   i) coating a substrate with the composition of claim 16, and
   ii) exposing those parts of the coated substrate, where a marking is intended, to energy in order to generate a marking.

* * * * *